US012795212B2

(12) United States Patent
Younessian et al.

(10) Patent No.: US 12,795,212 B2
(45) Date of Patent: Nov. 10, 2026

(54) METHODS AND SYSTEMS FOR PROVIDING CONTENT

(71) Applicant: Comcast Cable Communications, LLC, Philadelphia, PA (US)

(72) Inventors: Ehsan Younessian, Philadelphia, PA (US); Brandon Bell, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/760,361

(22) Filed: Jul. 1, 2024

(65) Prior Publication Data

US 2026/0006299 A1 Jan. 1, 2026

(51) Int. Cl.

*H04N 21/234* (2011.01)
*G06F 40/284* (2020.01)
*H04N 21/235* (2011.01)
*H04N 21/2387* (2011.01)
*H04N 21/2668* (2011.01)
*H04N 21/278* (2011.01)
*H04N 21/433* (2011.01)
*H04N 21/44* (2011.01)
*H04N 21/482* (2011.01)
*H04N 21/81* (2011.01)
*H04N 21/845* (2011.01)
*H04N 21/8549* (2011.01)

(52) U.S. Cl.

CPC ......... *H04N 21/812* (2013.01); *G06F 40/284* (2020.01); *H04N 21/2353* (2013.01); *H04N 21/8456* (2013.01)

(58) Field of Classification Search

None

See application file for complete search history.

(56) References Cited

U.S. PATENT DOCUMENTS 8,775,256 B2 * 7/2014 Rosenberg ........... H04N 21/454 705/14.67
9,003,288 B2 4/2015 Clarke-Martin et al.
9,538,122 B2 * 1/2017 Fitzsimmons ..... H04N 21/4325
2010/0005488 A1 * 1/2010 Rakib ................. G06F 16/7847 386/249
2019/0208273 A1 * 7/2019 Johnson ........... H04N 21/47815
2020/0099978 A1 * 3/2020 Korn .................... H04N 21/812

* cited by examiner

*Primary Examiner* — Brian T Pendleton
*Assistant Examiner* — Jean D Saint Cyr
(74) *Attorney, Agent, or Firm* — Ballard Spahr LLP

(57) ABSTRACT

Contextual information and topics associated with primary content and secondary content may be determined. Secondary content may be selected based on a similarity between the contextual information of the secondary content and the contextual information of the primary content.

20 Claims, 15 Drawing Sheets

400

| Segment 1 | | Segment 2 | | Segment 3 | | Segment 4 | | Segment 5 | | Average | |
|---|---|---|---|---|---|---|---|---|---|---|---|
| **Topic** | **P** | **Topic** | **P** | **Topic** | **P** | **Topic** | **P** | **Topic** | **P** | **Topic** | **P** |
| Food | 0.7 | Food | 0.6 | Ship | 0.7 | Sports | 0.7 | Cruise | 0.7 | Food | 0.34 |
| Cruise | 0.2 | Ship | 0.1 | Food | 0.2 | Food | 0.2 | Children | 0.2 | Cruise | 0.2 |
| Sports | 0.1 | Children | 0.2 | Sports | 0.1 | Cruise | 0.1 | Sports | 0.1 | Sports | 0.22 |
| | | | | | | | | | | Ship | 0.16 |

410

METHODS AND SYSTEMS FOR PROVIDING CONTENT

BACKGROUND

Advertisers aim to leverage the phenomenon of contextual relevance in advertising, recognizing that aligning advertisements with the subject matter of the content being consumed can significantly enhance the effectiveness of the advertisement. For instance, when a viewer is engrossed in a movie scene featuring food, presenting the viewer with a food commercial rather than an unrelated advertisement, such as for cars, capitalizes on the viewer's interest and exposure to the subject of the advertisement, even before the advertisement is output. This strategy taps into the viewer's current mindset, increasing the likelihood of engagement and receptiveness to the advertisement, ultimately maximizing its impact and effectiveness. Current systems serve advertisements without regard to the subject matter of the preceding primary content, thereby reducing effectiveness of the advertisements. Thus, there is a need for methods and systems to increase continuity between the primary content and secondary content.

SUMMARY

It is to be understood that both the following general description and the following detailed description are exemplary and explanatory only and are not restrictive. In some aspects, provided are methods and systems for targeted content delivery. Content, such as video and/or audio, can be analyzed to determine contextual information. Additional content, such as advertisements, can be determined for output before or after the content based on a similarity or difference between the contextual information of the content and contextual information of one or more advertisements. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
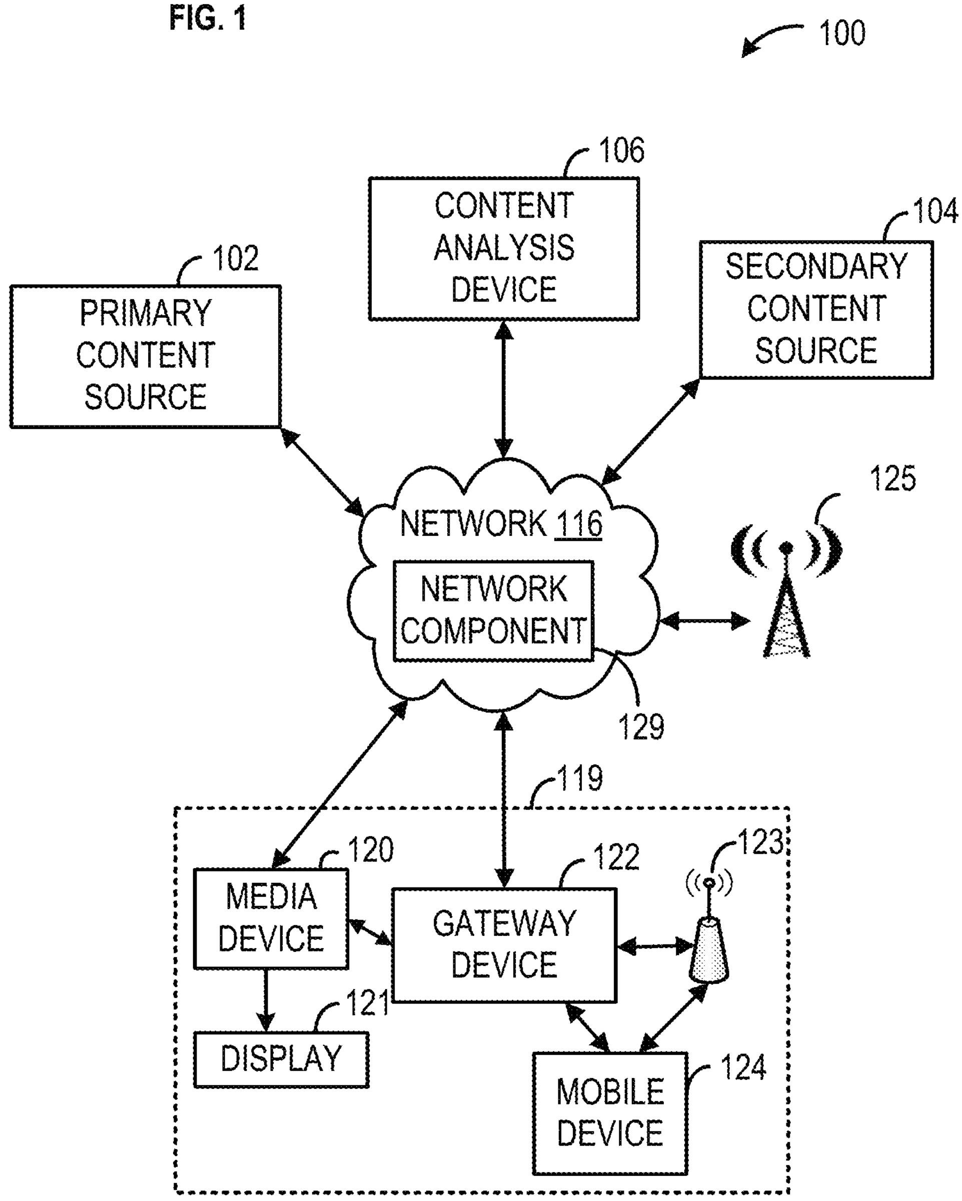
FIG. 1 is a block diagram illustrating various aspects of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for delivering and managing content. FIG. 1 shows a system 100 for content distribution. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may comprise a primary content source 102, a secondary content source 104, a content analysis device 106, a media device 120, a gateway device 122, and/or a mobile device 124. Each of the primary content source 102, the secondary content source 104, the media device 120, the gateway device 122, and/or the mobile device 124, can be one or more computing devices, and some or all of the functions performed by these components may at times be performed by a single computing device. The primary content source 102, the secondary content source 104, the content analysis device 106, the media device 120, the gateway device 122, and/or the mobile device 124 may be configured to communicate through a network 116. The network 116 may facilitate sending content to and from any of the one or more device described herein. For example, the network may be configured to facilitate the primary content source 102 and/or the secondary content source 104 sending primary content and/or secondary content to one or more of the media device 120, the gateway device 122, and/or the mobile device 124.

The network 116 may be a content delivery network, a content access network, combinations thereof, and the like. The network may be managed (e.g., deployed, serviced) by a content provider, a service provider, combinations thereof, and the like. The network 116 may be an optical fiber network, a coaxial cable network, a hybrid fiber-coaxial network, a wireless network, a satellite system, a direct broadcast system, or any combination thereof. The network 116 can be the Internet. The network 116 may have a network component 129. The network component 129 may be any device, module, combinations thereof, and the like communicatively coupled to the network 116. The network component 129 may be a router, a switch, a splitter, a packager, a gateway, an encoder, a storage device, a multiplexer, a network access location (e.g., tap), physical link, combinations thereof, and the like. The network component 129 may be any device, module, combinations thereof, and the like communicatively coupled to the network 116. The network component 129 may also be a router, a switch, a splitter, a packager, a gateway, an encoder, a storage device, a multiplexer, a network access location (e.g., tap), physical link, combinations thereof, and the like.

The primary content source 102 may be configured to send content (e.g., video, audio, movies, television, games, applications, data, etc.) to one or more devices such as the content analysis device 106, the media device 120, a network component 129, a first access point 123, a mobile device 124, a second access point 125, and/or the media device 120. The primary content source 102 may be configured to send streaming media, such as broadcast content, video on-demand content (e.g., VOD), content recordings, combinations thereof, and the like. For example, the primary content source 102 may be configured to send primary content, via the network 116, to the media device 120.

The primary content source 102 may be managed by third party content providers, service providers, online content providers, over-the-top content providers, combinations thereof, and the like. The content may be sent based on a subscription, individual item purchase or rental, combinations thereof, and the like. The primary content source 102 may be configured to send the content via a packet switched network path, such as via an IP based connection. The content may comprise a single content item, a portion of a content item (e.g., content fragment), a content stream, a multiplex that includes several content items, combinations thereof, and the like. The content may be accessed by users via applications, such as mobile applications, television applications, set-top-box (STB) applications, gaming device applications, combinations thereof, and the like. An application may be a custom application (e.g., by content provider, for a specific device), a general content browser (e.g., web browser), an electronic program guide, combinations thereof, and the like. The content may comprise signaling data.

The secondary content source 104 may be configured to send content (e.g., video, audio, movies, television, games, applications, data, etc.) to one or more devices such as the media device 120, the gateway device 122, the network component 129, the first access point 123, the mobile device 124, and/or a second access point 125. The secondary content source 104 may comprise, for example, a content server such as an advertisement server. The secondary content source 104 may be configured to send secondary content. Secondary content can comprise, for example, advertisements (interactive and/or non-interactive) and/or supplemental content such as behind-the-scenes footage or other related content, supplemental features (applications and/or interfaces) such as transactional applications for shopping and/or gaming applications, metadata, combinations thereof, and the like. The metadata may comprise, for example, demographic data, pricing data, timing data, configuration data, combinations thereof, and the like. For example, the configuration data may include formatting data and other data related to delivering and/or outputting the secondary content.

The secondary content source 104 may be configured to send streaming media, such as broadcast content, video on-demand content (e.g., VOD), content recordings, combinations thereof, and the like. The secondary content source 104 may be managed by third party content providers, service providers, online content providers, over-the-top content providers, combinations thereof, and the like. The content may be sent based on a subscription, individual item purchase or rental, combinations thereof, and the like. The secondary content source 104 may be configured to send the content via a packet switched network path, such as via an IP based connection. The content may comprise a single content item, a portion of a content item (e.g., content fragment), a content stream, a multiplex that includes several content items, combinations thereof, and the like. The content may be accessed by users via applications, such as mobile applications, television applications, STB applications, gaming device applications, combinations thereof, and the like. An application may be a custom application (e.g., by content provider, for a specific device), a general content browser (e.g., web browser), an electronic program guide, combinations thereof, and the like. The content may comprise signaling data.

The content analysis device 106 may be configured to receive, send, store, or process primary content and secondary content. The content analysis device 106 may be configured to determine contextual information, one or more relevance metrics, intensity information, one or more intensity metrics, one or more dominance metrics, combinations thereof, and the like.

The content analysis device 106 may be configured to receive primary content, analyze the primary content, and determine contextual information associated with the primary content. For example, the content analysis device 106 may determine first audio data associated with the primary content, first text data associated with the primary content, first image data associated with the primary content, first metadata associated with the primary content, combinations thereof, and the like. The content analysis device 106 may be configured to receive secondary content. The content analysis device may determine first audio data associated with the secondary content, second text data associated with the secondary content, second image data associated with the secondary content, second metadata associated with the secondary content, combinations thereof, and the like.

The content analysis device 106 may be configured to leverage video understanding capabilities to analyze one or more video segments preceding a pause moment. The content analysis device 106 may be configured to determine and display secondary that is contextually relevant to the primary content preceding the pause moment (e.g., a preceding segment), creating a more seamless user experience that can also improve the ad impression. Determining the contextual relevance may comprise determining a level of granularity (e.g., one or more levels of granularity, one or more degrees of granularity, one or more granularity thresholds, etc.) at which to analyze primary content and/or secondary content. The present systems and methods may consider one or more data types and/or one or more levels of analysis to determine the contextual relevance between the preceding one or more segments of primary content and the secondary content. One or more contextual relevance scores may be associated with (e.g., determined based on) one or more levels of granularity and thus yield one or more relevance scores at the one or more levels of granularity. For example, the content analysis device 106 may determine one or more segments of secondary content that are directly relevant, narrowly relevant, not relevant, semi-relevant, combinations thereof, and the like. For example, the levels of granularity may be determined based on a broad level analysis, an intermediate level analysis, a level narrow analysis, a specific level analysis, combinations thereof and the like. For example, a broad level analysis may consider all factors in a list of factors, an intermediate level analysis may include most factors, but not all, a narrow level analysis may include some factors but not others, and a specific level analysis may include consideration of only one factor. For example, a specific level analysis may only consider closed caption data, or even a single word of closed caption data. For example, a narrow level analysis may consider closed-caption data and brand data (e.g., identifying a mascot or logo in primary content and/or secondary content), but not audio data. For example, an intermediate level analysis may consider closed-caption data, brand data, and audio data, but not style (e.g., color theme) data. For example, a broad level analysis may consider closed-caption data, brand data, audio data, and style data. The various types of data may be weighted. For example, mascot and brand data may be weighted more than style or audio data. The aforementioned is merely exemplary and explanatory and it is to be understood than any data can carry any weight.

For example, the content analysis device 106 may, based on a pause indication (e.g., pause command) determine, based on one or more of text data, image data, audio data, metadata, combinations thereof, and the like, contextual information associated with the primary content being output (e.g., content being output during the pause moment, content that was output before the pause moment, and/or content that would be output after the pause moment). For example, the content analysis device 106 may, based on a pause indication (e.g., pause command) determine, based on one or more of text data, image data, audio data, metadata, combinations thereof, and the like, contextual information associated with available secondary content. For example, the content analysis device 106 may determine a contextual similarity between one or more relevance scores associated with the contextual information of the primary content and the contextual information of the secondary content and cause output, based on the similarity, of the secondary content. The content analysis device 106 may determine a relevance score configured to indicate how relevant (e.g., contextually similar) the secondary content is to the primary content. For example, the content analysis device 106 may determine a relevance score configured to indicate how relevant the secondary content is to a preceding segment of primary content.

The present systems and methods may be configured to determine the correlation between the segment descriptor and one or more secondary content descriptors does not satisfy a threshold. The present systems and methods may be configured to determine that more information (e.g., context information) is required in order to determine the correlation between the segment descriptor and one or more secondary content descriptors. For example, it may be determined the context information associated with the content segment that was being output when the pause command was received is insufficient to determine the relevance between the content segment that was being output when the pause command was received and the one or more secondary content segment descriptors (e.g., it may be determined that more contextual information is needed in order to determine the relevance between one or more content segments that were output before the pause moment and/or one or more content segments that were being output at the pause moment and/or one or more content segments that were to be output after the pause moment and one or more items of secondary content). In this case, more information may be needed. For example, additional context information associated with one or more content segments preceding the content segment that was being output when the pause command was received (e.g., one or more preceding content segments). For example, additional context information associated with one or more content segments following the content segment that was being output when the pause command was received (e.g., one or more following content segments) may be determined.

For example the present systems and methods may be configured to determine a change (e.g., a difference) in contextual information between one or more preceding content segments (e.g., one or more content segments preceding the pause moment), one or more current content segments (e.g., one or more content segments that were being output during the pause moment), and one or more subsequent content segments (e.g., one or more content segments that were to be output following the pause moment).

The present systems and methods may be configured to customize the appearance of selected secondary to better align with appearance of primary content and visual context of the primary content preceding the pause moment.

The media device 120 may be configured to receive the primary content. The media device 120 may comprise a device configured to enable an output device (e.g., a display, a television, a computer or other similar device) to output media (e.g., content). For example, the media device 120 may be configured to receive, decode, transcode, encode, send, and or otherwise process data and send data to, for example, the display device 121. The media device 120 may comprise a demodulator, decoder, frequency tuner, combinations thereof, and the like. The media device 120 may be directly connected to the network (e.g., for communications via in-band and/or out-of-band signals of a content delivery network) and/or connected to the network 116 via the gateway device 122 (e.g., for communications via a packet switched network). The media device 120 may implement one or more applications, such as content viewers, social media applications, news applications, gaming applications, content stores, electronic program guides, combinations thereof, and the like. Those skilled in the art will appreciate that the signal may be demodulated and/or decoded in a variety of equipment, including the gateway device 122, a computer, a TV, a monitor, or a satellite dish. The gateway device 122 may be located at the premises 119. The gateway device 122 may send the content to the media device 120.

The gateway device 122 may comprise a local gateway (e.g., router, modem, switch, hub, combinations thereof, and the like) configured to connect (or facilitate a connection between) a local area network (e.g., a LAN) to a wide area network (e.g., a WAN) such as the network 116. The gateway device 122 may be associated with the premises 119. The gateway device may configured to receive incoming data (e.g., data packets or other signals) from the network 116 and route the data to one or more other devices associated with the premises 116 (e.g., the mobile device 124, the media device 120, the display 121, the access point 123, combinations thereof, and the like. The gateway device 122 may be configured to communicate with the network 116. The gateway device 122 may be a modem (e.g., cable modem), a router, a gateway, a switch, a network terminal (e.g., optical network unit), combinations thereof, and the like. The gateway device 122 may be configured for communication with the network 116 via a variety of protocols, such as IP, transmission control protocol, file transfer protocol, session initiation protocol, voice over IP (e.g., VOIP), combinations thereof, and the like. The gateway device 122, for a cable network, may be configured to facilitate network access via a variety of communication protocols and standards, such as Data Over Cable Service Interface Specification (DOCSIS).

The gateway device 122 may be configured to cause an upstream device to send, to the media device 120, the requested content. For example, the gateway device may send, to the secondary content source 104, an address and/or identifier associated with the media device 120 and cause the secondary device 104 to send the secondary content to the media device 120 via the network 116 or another network (e.g., if the media device 120 is connected to one or more networks).

A first access point 123 (e.g., a wireless access point) may be located at the premises 119. The first access point 123 may be configured to provide one or more wireless networks in at least a portion of the premises 119. The first access point 123 may be configured to facilitate access to the network 116 to devices configured with a compatible wireless radio, such as a mobile device 124, the media device 120, the display device 121, or other computing devices (e.g., laptops, sensor devices, security devices). The first access point 123 may be associated with a user managed network (e.g., local area network), a service provider managed network (e.g., public network for users of the service provider), combinations thereof, and the like. It should be noted that in some configurations, some or all of the first access point 123, the gateway device 122, the media device 120, and the display device 121 may be implemented as a single device.

The premises 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, combinations thereof, and the like. The mobile device 124 may communicate with a variety of access points (e.g., at different times and locations or simultaneously if within range of multiple access points), such as the first access point 123 or the second access point 125.

Figure 2A:
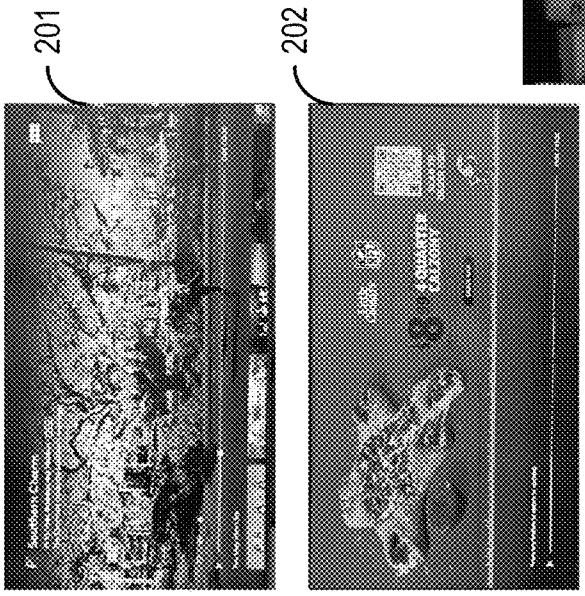
FIGS. 2A-2D illustrates example content.

FIG. 2A shows an example of a contextual misalignment between primary content 201 and secondary content 202. In the example, the primary content 201 is the show "Southern Charm," which is a reality television show chronicling the personal and professional lives of socialites in Charleston, South Carolina. Secondary content 202 is an advertisement for LITTLE CEASERS' "4-Quarter Calzony," a pizza-based calzone configurable to be divided into four portions. The subject matter of the secondary content 202 has virtually nothing in common with the subject matter of the recently output portions of the Southern Charm show. This mismatch fails to capitalize on recency bias, which is a cognitive, memory bias that gives greater import to recent events than events that happen in the past.

The present methods and systems, on the other hand, and as described in greater detail herein, improve upon such prior systems by determining, at various customizable and variable levels of granularity, one or more degrees of contextual relevance between primary content and secondary content.

Figure 2B:
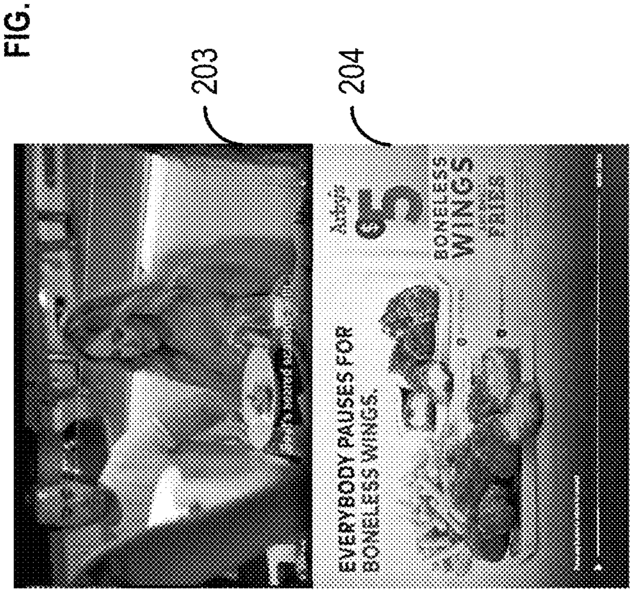

FIG. 2B, shows a contextual match between primary content 203 and secondary content 204, but does not achieve the level of granularity of the present methods and systems. For example in FIG. 2B, the primary content comprises closed caption data that mentions "seared scallops," and also comprises image data featuring a plate of food (e.g., seared scallops). Prior systems may determine, based on one or more of the closed caption data and/or image data that the content segment of primary content 203 is associated with one or more keywords such as "food," "seafood," or the like. The present methods and systems, however, may, through analysis of various data associated with the primary content and secondary content, achieve a level of granularity of contextual analysis which was previously not obtainable. For example, the present systems and methods may determine secondary content 204 that is not only associated with a high-level descriptor such as "food," but may also determine more granular contextual data such as "seafood," or "scallops." The present methods and systems, based on analysis of one or more frames of primary content preceding the pause moment, also determine that a waiter is speaking to a customer on yacht (e.g., by analyzing previous closed caption data, audio data that includes sounds associated with the sea, or boating) and thus determine one or more contextually relevant topics beyond simply "food" such as "ocean," "yacht," "cruise," etc., and serve secondary content that is contextually relevant with a greater degree of granularity. Thus, rather than serving an advertisement that is only loosely associated with the primary content at a high-level, the present methods and systems can determine, with greater granularity, the context of the preceding primary content, and present secondary content that is more specific and more closely related to the context of the primary content.

Figure 2C:
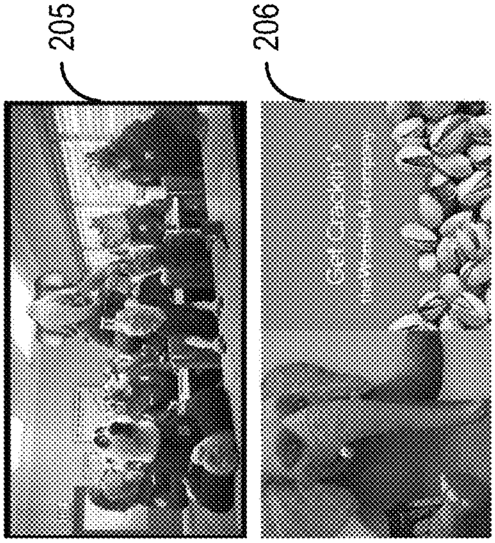

Similarly, FIG. 2C shows an example of high-granularity contextual matching between primary content 205 and secondary content 206. For example, as seen in FIG. 2C, primary content 205 includes image data of various animals, with an elephant featured prominently in the center. The present methods and systems (e.g., via recognition module described below), may recognize the elephant and associate one or more keywords such as "elephant," "bear," "tiger," and "rhinoceros." with the primary content. Further, based on various factors such as position on the screen, time on screen, amount of screen dedicated to the one or more animals, combinations thereof, and the like, the present methods and systems may determine one or more relevance scores associated with the one or more keywords. Further, the present methods and systems may determine one or more of the animals featured in the primary content is associated with a brand or logo indicator in a secondary content database. For example, the present methods and systems may determine a first segment of secondary content features an elephant as a mascot (e.g., the WONDERFUL Pistachios elephant), and a second segment of secondary content features a tiger as a mascot (e.g., Tony the Tiger from KELLOGS), and third segment of secondary content features a polar bear as the mascot (e.g., a polar bear associated with KLONDIKE bars). For example, the case of FIG. 2C, the relevance scores in this image may be determined based on a weighted sum of one or more relevance scores obtained from one or more individual detectors (e.g., a closed caption detector, an object detector, a mascot detector, a scene detector, a metadata relevance detector, combinations thereof, and the like). For example, because the elephant covers relatively more of the screen than the tiger or the polar bear, the elephant may be associated with a relatively higher relevance score than the tiger or polar bear (also, the rhino is in the back of the shot). For example, one or more objects, words, or other aspects of an image may be compared to one or more objects, words, or other data in a database. For example, a database may include an elephant as a brand mascot associated with WONDERFUL Pistachios. Similarly, the elephant, because it is in the center of the frame, may have a relatively higher relevance score than the tiger, who is almost off-screen to the right. Similarly, the fact that there are two tigers featured in the primary content, may determine that secondary content featuring and/or associated with Tony the Tiger is more contextually relevant than the KLONDIKE polar bear, because there is only one polar bear featured in the segment of primary content. The aforementioned example is merely exemplary and explanatory and a person skilled in the art would understand it to not be limiting.

One or more settings may be implemented to determine one or more weights associated with the one or more relevance factors. For example, one or more content consumption histories associated with one or more users may be analyzed to determine one or more likely viewer characteristics associated with a user presently viewing the primary content, and weights associated with the one or more factors may be determined and/or adjusted based thereon. For example, the primary content features various animals dressed as law enforcement officers. The primary content is likely intended for an audience of children, and thus, more weight may be placed on the identity (e.g., species) of the animals than the fact that the animals are dressed as policemen because children may place more import on the presence of animals, than the presence of law enforcement officers. If however, it is determined, for example, that the primary content is being viewed late at night, when a child is not likely to be viewing the content and thus it is more likely an adult is viewing the primary content, a content consumption history associated with an adult may be determined. For example, it may be determined that a user at the premises likes police dramas, and thus secondary content associated with a police drama available for download or streaming may be served.

The present methods and systems may determine, in a manner similar to the above with respect to primary content, one or more relevance scores associated with one or more items of available secondary content. For example, as seen in FIG. 2C, the present methods and system may determine an item of secondary content that features an elephant with a similarly high relevance score and output the secondary content.

Figure 2D:
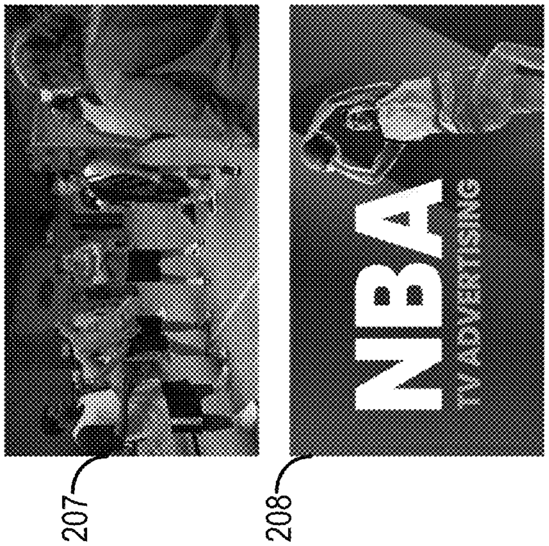

FIG. 2D also shows contextual alignment between primary content 207 and secondary content 208. For example, the present systems and methods may be configured to determine contextual information associated with primary content 207. For example, the present systems and methods may input primary content 207 into a transformer to generate one or more text descriptions. Inputting the primary content 207 into a transformer may comprise inputting text data, image data, metadata, other data, combinations thereof, and the like into a generative pre-trained transformer (e.g., a GPT).

For example, in FIG. 2D, the content analysis device may analyze text data (e.g., closed caption data), visual data, audio data, metadata, and other data associated with the primary content. For example, an analysis of visual data may determine the primary content features clothing (e.g., shorts and t-shirts) and a basketball. Prior systems may determine the primary context of the primary content may be primarily concerned with clothing and serve secondary content (e.g., advertisements) featuring clothing (e.g., shorts and t-shirts). The present systems may take a more granular approach and, based on analysis of one or more segments of primary content preceding the pause moment, determine the context of the one or more segments of primary content preceding the pause moment are about basketball. For example, an analysis of text data may determine conversation about basketball (e.g., mention of a basketball, teams, a hoop, or other phrases related to basketball). For example, image analysis may determine the presence of a basketball, one or more hoops, and/or markings on the floor commonly associated with basketball (e.g., a three-point line). Thus, the present systems and methods improve upon prior systems by executing and achieving a more granular analysis of the context of the one or more segments of primary content preceding the pause moment.

Various machine learning algorithms can be used for determining the emotion behind the expression in facial analysis. Convolutional neural networks (CNNs) may be used in facial analysis tasks such as face detection, facial feature extraction, and expression analysis. They can be trained on large datasets of labeled images to learn to recognize patterns in facial expressions and link them to specific emotions. Support vector machines (SVMs) are a type of supervised learning algorithm that can be used to classify facial expressions into specific emotions based on features extracted from the image or video. SVMs work by finding the best hyperplane that separates the different classes of expressions.

Random forests are an ensemble learning method that can be used to classify facial expressions by training multiple decision trees on different subsets of the data. Random forests can be used for both classification and regression tasks.

Recurrent neural networks (RNNs may be used in time-series analysis tasks such as speech recognition and natural language processing. They can be used in facial analysis to model the temporal dynamics of facial expressions and link them to specific emotions over time. Deep belief networks (DBNs) are a type of unsupervised learning algorithm that can be used to learn hierarchical representations of facial expressions and link them to specific emotions. DBNs are particularly useful for analyzing complex and high-dimensional data such as facial expressions.

Figure 3:
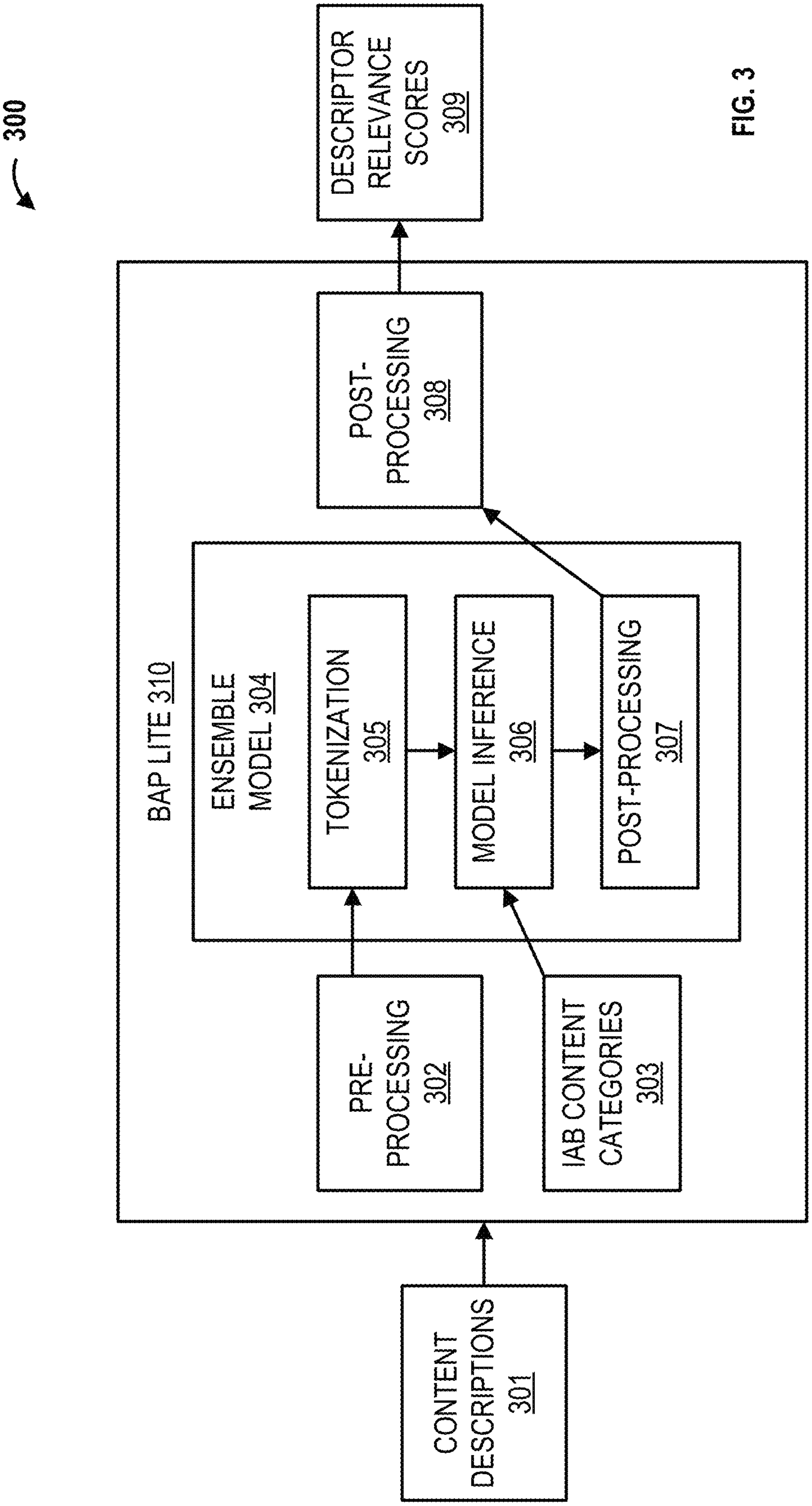
FIG. 3 shows an example system.

FIG. 3 shows an example Brand Alignment Processing (BAP) system 300. The BAP system 300 may comprise a BAP device 310. The BAP device 310 may comprise a pre-processing module 302, an IAB categories module 303, an ensemble module 304, and a post-processing module 308. The BAP device 310 may be configured to receive one or more content descriptions 301. The one or more content descriptions may comprise one or more topics, one or more keywords, one or more subjects, combinations thereof, and the like associated with one or more content segments. The one or more content segments may comprise one or more segments of primary content and/or one or more segments of secondary content. The one or more content descriptions may comprise one or more text descriptions. The one or more text descriptions may be determined by (e.g., generated by) a transformer such as a GPT.

For example, the pre-processing module 302 may be configured to receive the one or more text descriptions and clean the one or more text descriptions. Pre-processing may comprise one or more of: removing excessive special characters, splitting the text descriptions into batches, noise removal, tokenization, normalization, stopword removal, stemming, lemmatization, entity recognition, and/or language detection. For example, noise removal may comprise removing any irrelevant or extraneous information from the text, such as special characters, formatting symbols, or non-alphanumeric characters that may have been introduced during the generation process. For example, tokenization may comprise breaking down the text into smaller units, such as words or subwords, known as tokens, to facilitate subsequent analysis or processing tasks. For example, normalization may comprise ensuring consistency in the text data by converting all characters to lowercase, standardizing punctuation marks, and handling contractions or abbreviations. For example, stopword removal may comprise eliminating common words such as "the," "and," or "is" that may not contribute significantly to the overall meaning or analysis of the text. For example, stemming or lemmatization may comprise reducing words to their base or root forms to consolidate similar terms and improve computational efficiency. For example, entity recognition may comprise identifying and tagging specific entities or named entities within the text, such as people, organizations, locations, or dates. For example, language detection may comprise determining the language of the text to apply language-specific processing techniques if necessary.

For example, the IAB category module 303 may be configured to organize the received text descriptions from GPT-generated content according to the taxonomies established by the Interactive Advertising Bureau (IAB). For example, the IAB module 303 may be configured to convert each ad word in the IAB taxonomy to a numeric representation (e.g., word embedding) configured to be matched against one or more queries. For example, the IAB category module 303 may be configured to incorporate the standardized classification systems developed by the IAB, which delineate categories for a wide array of content, spanning advertisements, websites, and digital media. Upon receiving the text descriptions, the IAB category module 303 may be configured to analyze the content and identify pertinent keywords, phrases, or themes within the text. Utilizing the IAB taxonomies as a reference, the module may classify the text descriptions into appropriate categories based on various criteria such as subject matter, content type, or industry vertical. Once classified, the module may output the categorized text descriptions along with their corresponding IAB categories. This categorization may enhance the device's functionality, facilitating targeted advertising, content recommendation, content filtering, and audience segmentation, among other applications.

The ensemble module 304 may be configured for ensemble modeling. Ensemble modeling refers to a process where one or more diverse models are created to predict one or more outcomes, either by using many different modeling algorithms and/or using different training data sets. An ensemble model may be configured to aggregate a prediction of each base model and determine one or more final predictions for unseen data. For example, the ensemble module 304 may be a model definition configured to chain inputs/outputs of multiple models. For example, the ensemble module 304 may be configured to chain text to tokens to integers representing the text to model inferences to vector float numbers to post-processing to relevance scores, combinations thereof, and the like. For example, unseen data may be text input to the ensemble. The ensemble module 304 may be configured to convert one or more batches of raw text into one or more numeric inputs to the language model (e.g., tokenization module 305). The ensemble module may be configured as an open-source deep learning deployment infrastructure.

The tokenization module 305 may comprise a WordPiece module. WordPiece is a subword segmentation algorithm used in natural language processing. The vocabulary is initialized with individual characters in the language, then the most frequent combinations of symbols in the vocabulary are iteratively added to the vocabulary. For example, the tokenization module 305 may be configured to: initialize the word unit inventory with all the characters in the text; build a language model on the training data using the inventory from the previous step; generate a new word unit by combining two units out of the current word inventory to increment the word unit inventory by one; choose the new word unit out of all the possible ones that increases the likelihood on the training data the most when added to the model; and repeat until a predefined limit of word units is reached or the likelihood increase falls below a certain threshold.

The ensemble module 304 may be configured to retrieve one or more outputs from one or more language models (e.g., model inference module 306). The model inference module 306 may be configured to output one or more numeric representations of input text (e.g., called an "embedding"). This may be a vector of floating point numbers (e.g., 384-Dimensional). Thus, by determining the "distance" between embeddings, a closest ad keyword to a given text segment may be determined. The distance calculation may be performed by either of the post-processing modules 307 or 308.

The ensemble module 304 may be configured to match one or more outputs against one or more stored numeric representations of IAB Ad categories (e.g., post-processing module 307). The post-processing module 307 may be configured to calculate one or more "distances" between the numeric representations of text, and the numeric representations of IAB Content Categories from 306.

The post-processing module 308 may be configured to aggregate and organize one or more relevance scores per batch. The post-processing module 308 may be configured to return one or more final scores for each entry in an IAB category list. The post-processing module 308 may be configured to apply additional business logic to the ranked list output of relevance scores (ex: filtering, thresholding) from 307 to be delivered to the end-user in 309.

The BAP device 310 may be configured to output one or more content descriptor relevance scores 309. The one or more content descriptor relevance scores may be configured to indicate how relevant one or more content descriptors are to a given segment of content (e.g., primary and/or secondary content). For example, the BAP device 310 may be configured to determine one or more vectors. For example, a vector may be a vector of one or more floating-point numbers. For example, the relevance may be a cosine similarity between a vector representing the text, and a vector representing each IAB Content Category. Thus, the more similar the vector is for a given Content Category, the more relevant that Content Category is for a particular text element.

Figures 4A, 4B:
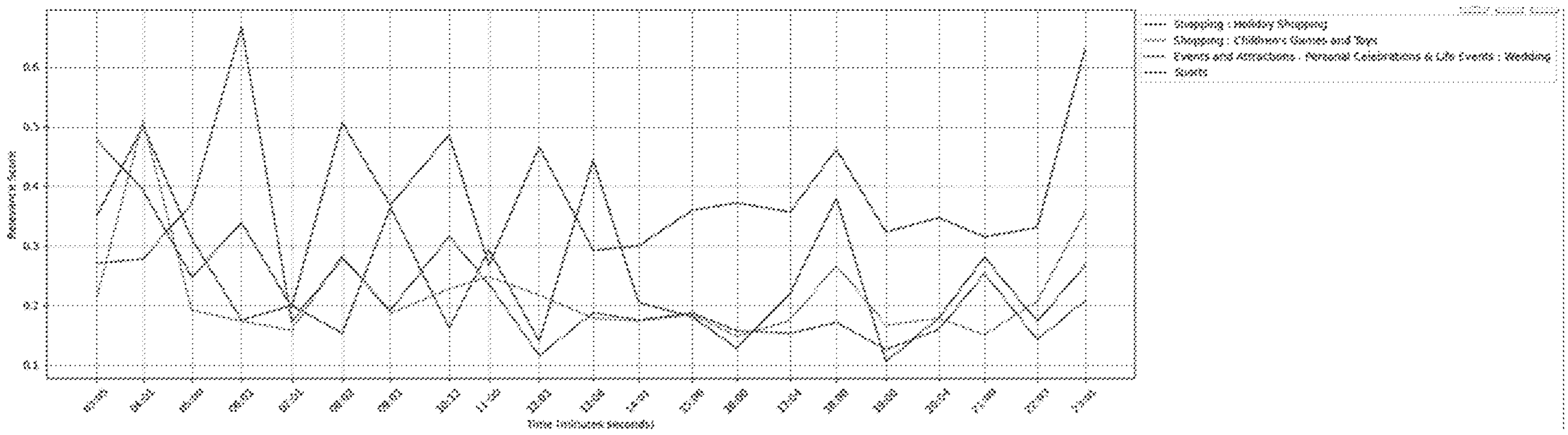
FIGS. 4A-4B show example diagrams.

FIG. 4A shows contextual information 400 displayed as example topic relevance distributions. The contextual information 400 may be used to determine relevant content to a user based on the user's viewing history and/or what the user is consuming at a given time (e.g., what the user is currently watching, what the user was watching immediately prior to a pause). The contextual information 400 may be a collection of topics determined and weighted based on contextual data (e.g., closed captioning data/information, image recognition data, optical character recognition data, linear metadata, etc. . . . ) associated with the user's television (e.g., streaming content, linear television, live television, etc. . . . ) viewing history.

The contextual information 400 may be associated with a plurality of content segments. Each content segment of the plurality of content segments may be associated with content such as a program/show that the user accessed, consumed, and/or watched. Each content segment of the plurality of content segments may be associated with one or more identifiers and/or timing information. A viewer history (e.g., contextual information 400) may be a collection of data associated with timing information (e.g., dates, times, points in time relative to the beginning or end of content, etc. . . . ) going back of any length of time such as a day, a week, a year, and the like. A viewer history (e.g., contextual information 400) may be a collection of data associated with historical time windows (and time windows) for any duration of time (e.g., the preceding hour, minute, 10 seconds, 1 second, etc. . . . ). There is no limit as to how far back in a user's viewing history for which content segment consumption data may be generated and stored and contextual information (e.g., content access/history information associated with a user, viewer information, etc. . . . ) determined.

Each content segment of the plurality of content segments may be generated/created (e.g., generated/created by the content analysis device 128) based on contextual data (e.g., closed captioning data/information, linear metadata, etc. . . . ) associated with content such as a program/show that the user accessed, consumed, and/or watched during the respective time window. The content of each content segment of the plurality of content segments may comprise and/or be associated with one or more topics. The topics may be determined by analyzing/extracting text associated with the contextual data (e.g., closed captioning data/information, linear metadata, etc. . . . ) and determining a frequency of certain words and/or phrases, for example. As another example, the topics may be determined by extracting text from the contextual data and processing the text via natural language processing. Additionally, the topics may be determined by analyzing text associated with the contextual data and extracting the topics by any suitable means.

The contextual information of each content segment of the plurality of content segments may be a mixture of topics. For example, a news program associated with content segment 401 may include many different topics such as finance related topics, crime related topics, and sports related topics. A relevance distribution function may be applied to the topics of each content segment of the plurality of content segments to generate a relevance distribution of the topics associated with each content segment. For example, the content segment 1 may comprise a relevance distribution of its related topics where there is a 70 percent relevance of food related topics, there is a 20 percent relevance of cruise related topics, and there is a 10 percent relevance of sports topics.

The contextual information 400 may comprise a summation (e.g., an average, a weighted average, a low-rank approximation, etc. . . . ) of the relevance distribution of topics associated with each content segment of the plurality of content segments. Contextual information (e.g., contextual information 400) may comprise any quantity of relevance distribution of topics associated with any quantity of content segments. The contextual information 400 may comprise a relevance distribution of topics 406 derived from the summation of the relevance distributions of topics associated each content segment of the plurality of content segments. To further associate contextual information with a particular user, the contextual information 400 may be saved/stored as a viewing profile.

As seen in FIG. 4A, each content segment of the one or more content segments may be associated with a relevance profile and the one or more relevance profiles (e.g., topic distributions) may be averaged over any length of time to determine an average topic relevance profile for a given number of content segments. The number of content segments (and by extension, length of time) considered in determining the topics most relevant at the pause moment may be any number of content segments or any length of time.

FIG. 4B shows a plot of instantaneous relevance of one or more topics. The most relevant topics in FIG. 4B are "shopping: holiday shopping," "shopping: children's games," "events and attractions: personal celebrations & life events: wedding," and "sports." As seen in FIG. 4B, the instantaneous relevance value of the various topics vary with time (and ostensibly with segment). Thus, the time at which the pause indication is received (and the temporal proximity of the one or more segments) will influence which secondary content is served to the user.

Figure 5:
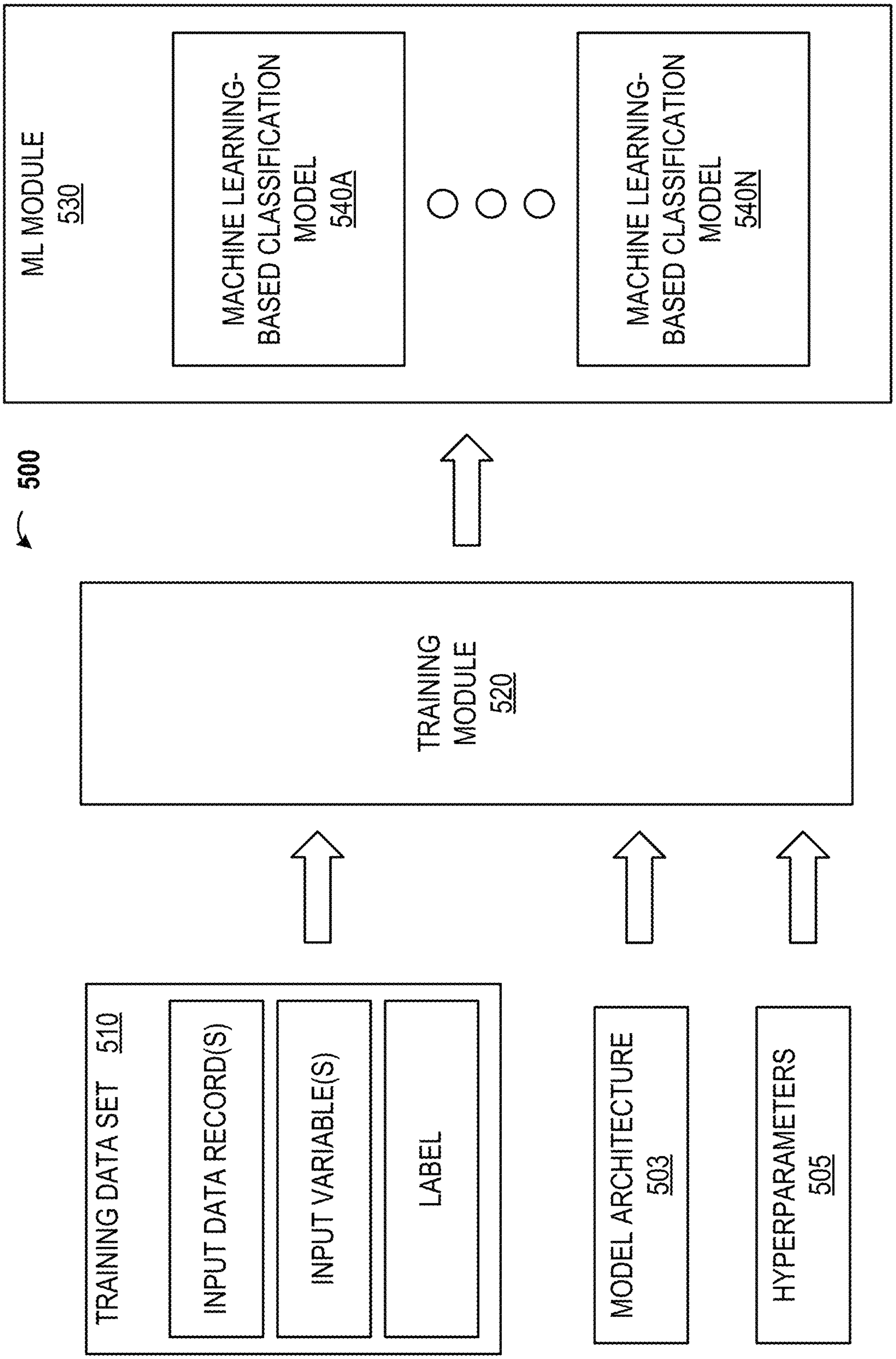
FIG. 5 is a flowchart illustrating an example method.

Turning now to FIG. 5, an example method 500 is shown. While FIG. 5 illustrates a training method, it is to be understood that the systems and methods described herein may be implemented via pre-trained model. The method 500 may be performed based on an analysis of one or more training data sets 510 by a training module 520, at least one ML module 530 that is configured to provide one or more of a prediction or a score associated with data records and one or more corresponding variables. The training module 520 may be configured to train and configure the ML module 530 using one or more hyperparameters 505 and a model architecture 503. The one or more hyperparameters 505 may include audio segment duration, text segment duration, combinations thereof, and the like. The model architecture 503 may comprise a predictive model as described herein. The hyperparameters 505 may comprise a number of neural network layers/blocks, a number of neural network filters (e.g., convolutional filters) in a neural network layer, a number of epochs etc. For text features, a transformer-based encoder model may be used. For audio features, one or more CNN based models may be used. Each set of the hyperparameters 505 may be used to build the model architecture 503, and an element of each set of the hyperparameters 505 may comprise a number of inputs (e.g., data record attributes/variables) to include in the model architecture 503. For example, the first set of hyperparameters may be associated with a first model. The first model may be associated with a first task (e.g., a source task). The first task may comprise population level analysis. The second set of hyperparameters may be associated with a second model. The second model may be associated with a second task (e.g., the target task). In other words, an element of each set of the hyperparameters 505 may indicate that as few as one or as many as all corresponding attributes of the data records and variables are to be used to build the model architecture 503 that is used to train the ML module 530.

The training data set 510 may comprise one or more input data records associated with one or more labels (e.g., a binary label (yes/no, hypo/non-hypo), a multi-class label (e.g., hypo/non/hyper) and/or a percentage value). The label for a given record and/or a given variable may be indicative of a likelihood that the label applies to the given record. A subset of the data records may be randomly assigned to the training data set 510 or to a testing data set. In some implementations, the assignment of data to a training data set or a testing data set may not be completely random. In this case, one or more criteria may be used during the assignment. In general, any suitable method may be used to assign the data to the training or testing data sets, while ensuring that the distributions of yes and no labels are somewhat similar in the training data set and the testing data set.

The training module 520 may train the ML module 530 by extracting a feature set from a plurality of data records (e.g., labeled as yes, hypo/hyper, no for normo) in the training data set 510 according to one or more feature selection techniques. For example, text-based and audio-based features may be extracted which describe the subject matter present in an input content. The training module 520 may train the ML module 530 by extracting a feature set from the training data set 510 that includes statistically significant features of positive examples (e.g., labeled as being yes) and statistically significant features of negative examples (e.g., labeled as being no).

The training module 520 may extract a feature set from the training data set 510 in a variety of ways. The training module 520 may perform feature extraction multiple times, each time using a different feature-extraction technique. In an example, the feature sets generated using the different techniques may each be used to generate different machine learning-based classification models 540A-440N. For example, the feature set with the highest quality metrics may be selected for use in training. The training module 520 may use the feature set(s) to build one or more machine learning-based classification models 540A-440N that are configured to indicate whether a particular label applies to a new/unseen data record based on its corresponding one or more variables.

The training data set 510 may be analyzed to determine any dependencies, associations, and/or correlations between features and the yes/no labels in the training data set 510. The identified correlations may have the form of a list of features that are associated with different yes/no labels. The term "feature," as used herein, may refer to any characteristic of an item of data that may be used to determine whether the item of data falls within one or more specific categories. A feature selection technique may comprise one or more feature selection rules. The one or more feature selection rules may comprise a feature occurrence rule. The feature occurrence rule may comprise determining which features in the training data set 510 occur over a threshold number of times and identifying those features that satisfy the threshold as candidate features.

Two commonly-used retraining approaches are based on initialization and feature extraction. In the initialization approach the whole network is further trained, while in the feature extraction approach the last few fully-connected layers are trained from a random initialization, and other layers remain unchanged. In addition to these two approaches, a third approach may be implemented by combining these two approaches (e.g., the last few fully-connected layers are further trained, and other layers remain unchanged).

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 510 to generate a first list of features. A final list of candidate features may be determined, generated, and/or analyzed according to additional feature selection techniques to determine one or more candidate feature groups (e.g., groups of features that may be used to predict whether a label applies or does not apply). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., yes/no).

As another example, one or more candidate feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more candidate feature groups. Forward feature selection is an iterative method that begins with no feature in the machine learning model. In each iteration, the feature which best improves the model is added until an addition of a new variable does not improve the performance of the machine learning model. As an example, backward elimination may be used to identify one or more candidate feature groups. Backward elimination is an iterative method that begins with all features in the machine learning model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside (e.g., includes and/or excludes) the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 520 has generated a feature set(s), the training module 520 may generate one or more machine learning-based classification models 540A-540N based on the feature set(s). A machine learning-based classification model may refer to a complex mathematical model for data classification that is generated using machine-learning techniques. In one example, the machine learning-based classification model 540 may include a map of support vectors that represent boundary features. By way of example, boundary features may be selected from, and/or represent the highest-ranked features in, a feature set. The boundary features may be configured to separate or classify data points into different categories or classes. The boundary features may be configured to determine, for example, relevance scores associated with keywords in content.

The training module 520 may use the feature sets extracted from the training data set 510 to build the one or more machine learning-based classification models 540A-440N for each classification category (e.g., yes, no, hypo/non, hypo/non/hyper). In some examples, the machine learning-based classification models 540A-440N may be combined into a single machine learning-based classification model 540. Similarly, the ML module 530 may represent a single classifier containing a single or a plurality of machine learning-based classification models 540 and/or multiple classifiers containing a single or a plurality of machine learning-based classification models 540.

The extracted features (e.g., one or more candidate features) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 530 may comprise a decision rule or a mapping for each candidate feature.

The candidate feature(s) and the ML module 530 may be used to predict whether a label applies to a data record in the testing data set. In one example, the result for each data record in the testing data set includes a confidence level that corresponds to a likelihood or a probability that the one or more corresponding variables are indicative of the label applying to the data record in the testing data set. The confidence level may be a value between zero and one, and it may represent a likelihood that the data record in the testing data set belongs to a yes/no status with regard to the one or more corresponding variables. In one example, when there are two statuses (e.g., yes and no), the confidence level may correspond to a value p, which refers to a likelihood that a particular data record in the testing data set belongs to the first status (e.g., yes). In this case, the value 1−p may refer to a likelihood that the particular data record in the testing data set belongs to the second status (e.g., no). In general, multiple confidence levels may be provided for each data record in the testing data set and for each candidate feature when there are more than two labels. A top performing candidate feature may be determined by comparing the result obtained for each test data record with the known yes/no label for each data record. In general, the top performing candidate feature will have results that closely match the known yes/no labels. The top performing candidate feature(s) may be used to predict the yes/no label of a data record with regard to one or more corresponding variables. For example, a new data record may be determined/received. The new data record may be provided to the ML module 530 which may, based on the top performing candidate feature, classify the label as either applying to the new data record or as not applying to the new data record.

Figure 6:
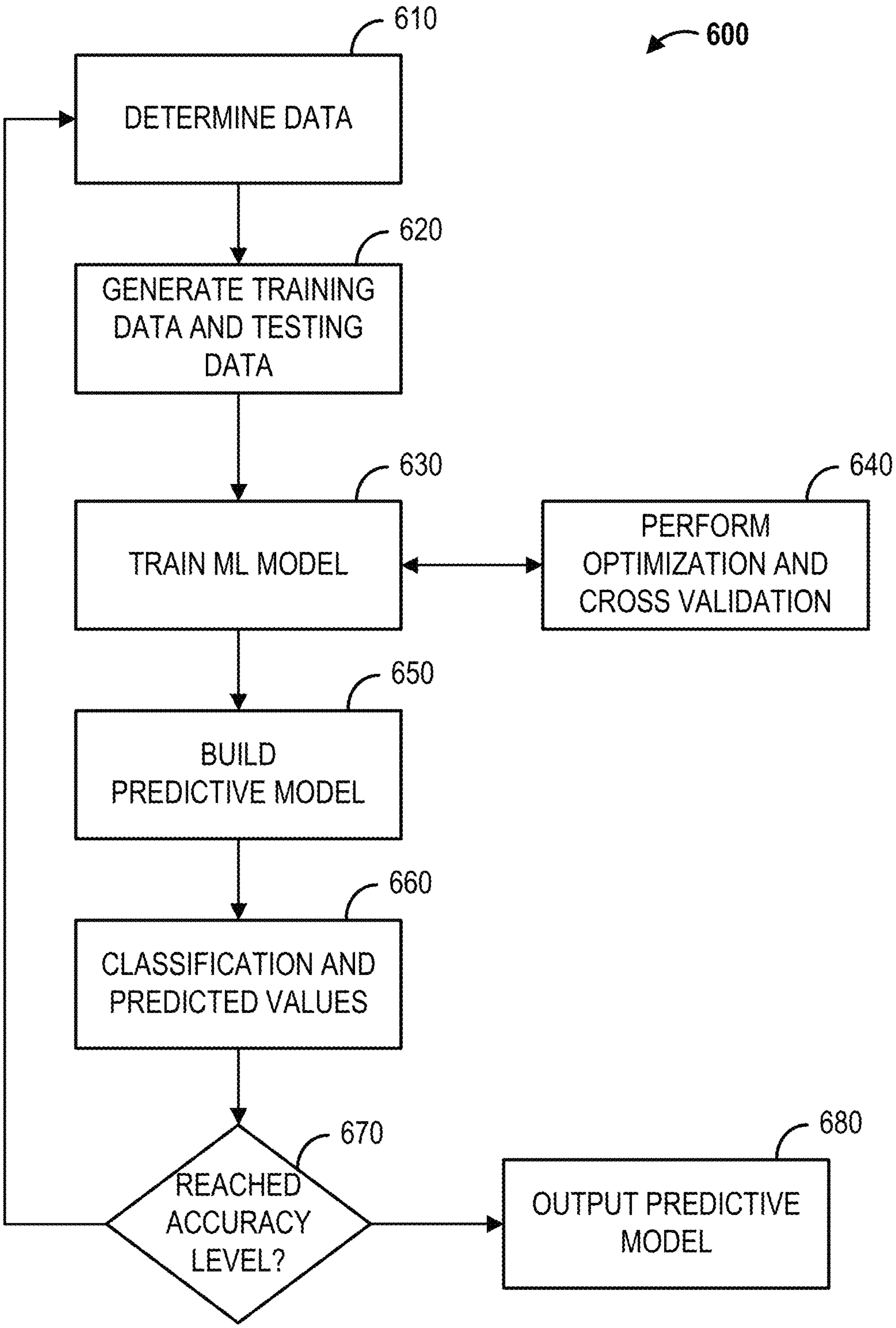
FIG. 6 is a flowchart illustrating an example method.

FIG. 6 shows a flowchart illustrating an example training method 600 for generating the ML module 530 using the training module 520 is shown. The training module 520 can implement supervised, unsupervised, and/or semi-supervised (e.g., reinforcement based) machine learning-based classification models 540A-540N. The training module 520 may comprise a data processing module and/or a predictive module. The method 600 illustrated in FIG. 6 is an example of a supervised learning method; variations of this example of training method are discussed below, however, other training methods can be analogously implemented to train unsupervised and/or semi-supervised machine learning models.

The training method 600 may determine (e.g., access, receive, retrieve, etc.) first data records that have been processed by the data processing module at step 610. The first data records may comprise a labeled set of data records. The labels may correspond to a label (e.g., yes or no). The training method 600 may generate, at step 620, a training data set and a testing data set. The training data set and the testing data set may be generated by randomly assigning labeled data records to either the training data set or the testing data set. In some implementations, the assignment of labeled data records as training or testing samples may not be completely random. As an example, a majority of the labeled data records may be used to generate the training data set. For example, 65% of the labeled data records may be used to generate the training data set and 65% may be used to generate the testing data set. The training data set may comprise population data that excludes data associated with a target patient.

The training method 600 may train one or more machine learning models at step 630. In one example, the machine learning models may be trained using supervised learning. In another example, other machine learning techniques may be employed, including unsupervised learning and semi-supervised. The machine learning models trained at 630 may be selected based on different criteria depending on the problem to be solved and/or data available in the training data set. For example, machine learning classifiers can suffer from different degrees of bias. Accordingly, more than one machine learning model can be trained at 630, optimized, improved, and cross-validated at step 640.

For example, a loss function may be used when training the machine learning models at step 630. The loss function may take true labels and predicted outputs as its inputs, and the loss function may produce a single number output. The present methods and systems may implement a mean absolute error, relative mean absolute error, mean squared error and relative mean squared error using the original training dataset without data augmentation.

One or more minimization techniques may be applied to some or all learnable parameters of the machine learning model (e.g., one or more learnable neural network parameters) in order to minimize the loss. For example, the one or more minimization techniques may not be applied to one or more learnable parameters, such as encoder modules that have been trained, a neural network block(s), a neural network layer(s), etc. This process may be continuously applied until some stopping condition is met, such as a certain number of repeats of the full training dataset and/or a level of loss for a left-out validation set has ceased to decrease for some number of iterations. In addition to adjusting these learnable parameters, one or more of the hyperparameters 505 that define the model architecture 503 of the machine learning models may be selected. The one or more hyperparameters 505 may comprise a number of neural network layers, a number of neural network filters in a neural network layer, etc. For example, as discussed above, each set of the hyperparameters 505 may be used to build the model architecture 503, and an element of each set of the hyperparameters 505 may comprise a number of inputs (e.g., data record attributes/variables) to include in the model architecture 503. The element of each set of the hyperparameters 505 comprising the number of inputs may be considered the "plurality of features" as described herein. That is, the cross-validation and optimization performed at step 640 may be considered as a feature selection step. An element of a second set of the hyperparameters 605 may comprise data record attributes for a particular patient. In order to select the best hyperparameters 505, at step 640 the machine learning models may be optimized by training the same using some portion of the training data (e.g., based on the element of each set of the hyperparameters 505 comprising the number of inputs for the model architecture 503). The optimization may be stopped based on a left-out validation portion of the training data. A remainder of the training data may be used to cross-validate. This process may be repeated a certain number of times, and the machine learning models may be evaluated for a particular level of performance each time and for each set of hyperparameters 505 that are selected (e.g., based on the number of inputs and the particular inputs chosen).

A best set of the hyperparameters 505 may be selected by choosing one or more of the hyperparameters 505 having a best mean evaluation of the "splits" of the training data. This function may be called for each new data split, and each new set of hyperparameters 505. A cross-validation routine may determine a type of data that is within the input (e.g., attribute type(s)), and a chosen amount of data (e.g., a number of attributes) may be split-off to use as a validation dataset. A type of data splitting may be chosen to partition the data a chosen number of times. For each data partition, a set of the hyperparameters 505 may be used, and a new machine learning model comprising a new model architecture 503 based on the set of the hyperparameters 505 may be initialized and trained. After each training iteration, the machine learning model may be evaluated on the test portion of the data for that particular split. The evaluation may return a single number, which may depend on the machine learning model's output and the true output label. The evaluation for each split and hyperparameter set may be stored in a table, which may be used to select the optimal set of the hyperparameters 505. The optimal set of the hyperparameters 505 may comprise one or more of the hyperparameters 505 having a highest average evaluation score across all splits.

The training method 600 may select one or more machine learning models to build a predictive model at 650. The predictive model may be evaluated using the testing data set. The predictive model may analyze the testing data set and generate one or more of a prediction or a score at step 660. The one or more predictions and/or scores may be evaluated at step 670 to determine whether they have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified a label as applying to a given data record when in reality the label did not apply. Conversely, the false negatives of the predictive model may refer to a number of times the machine learning model indicated a label as not applying when, in fact, the label did apply. True negatives and true positives may refer to a number of times the predictive model correctly classified one or more labels as applying or not applying. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 530) may be output at step 680; when the desired accuracy level is not reached, however, then a subsequent iteration of the training method 600 may be performed starting at step 610 with variations such as, for example, considering a larger collection of data records.

Figure 7:
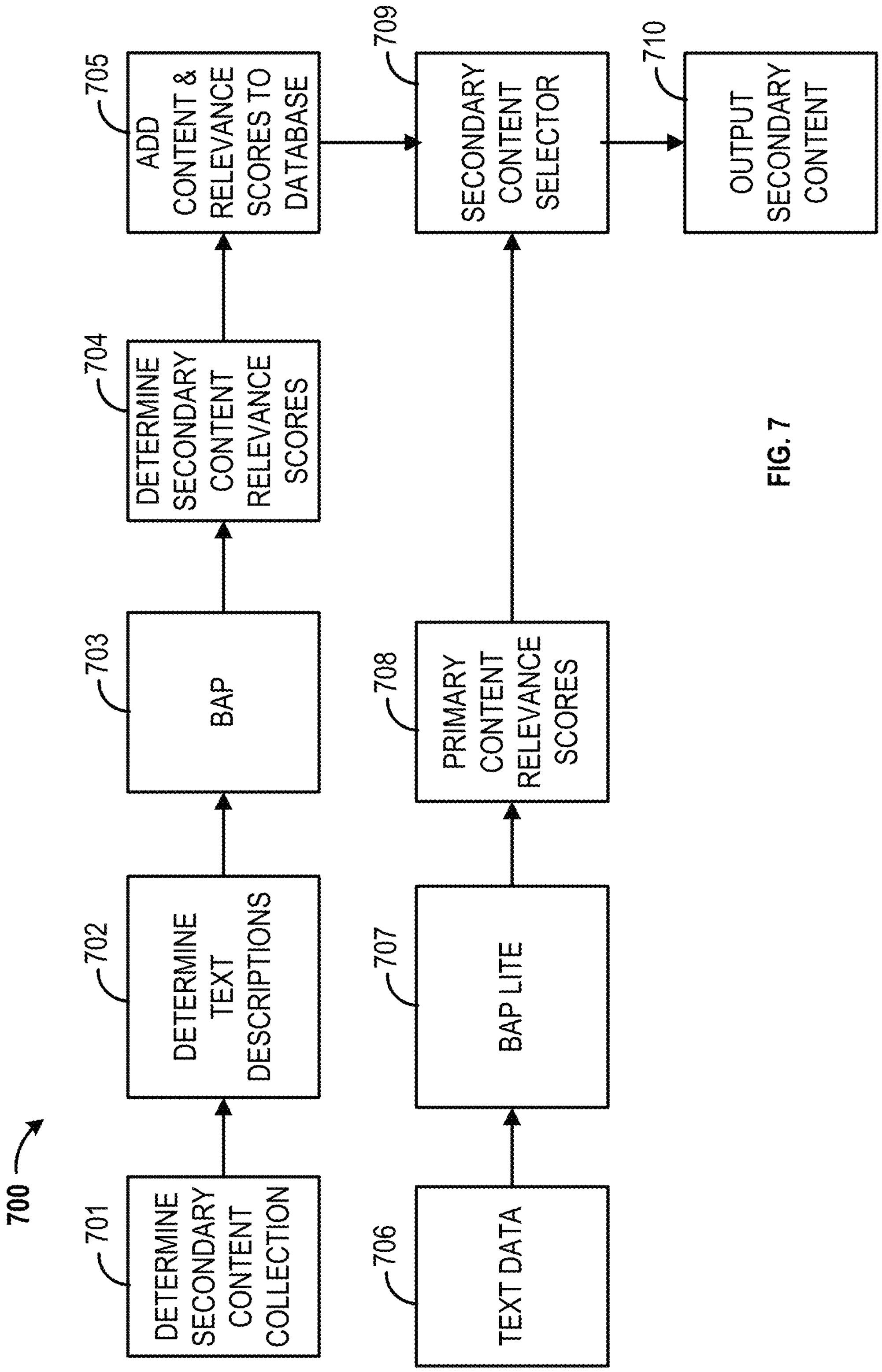
FIG. 7 is a flowchart illustrating an example method.

FIG. 7 shows an example method 700. At 701, one or more items of secondary content may be determined. The secondary content may comprise, for example, one or more advertisements. The secondary content may be determined by querying a database configured to store content. At 702, one or more text-based descriptions associated with the one or more items of secondary content may be determined. For example, the one or more text-based descriptions of the one or more items of secondary content may be determined by inputting the one or more items of secondary content into a transformer (e.g., a GPT). The one or more text-based descriptions of the one or more items of secondary content may comprise one or more topics, one or more keywords, combinations thereof, and the like. The one or more text-based descriptions may be associated with (e.g., determined at), one or more different levels of granularity. For example, the one or more text-based descriptions may be determined based on a broad level analysis, intermediate level analysis, narrow level analysis, specific level analysis, combinations thereof, and the like as described herein. For example, the levels of granularity may be determined based on a broad level analysis, a intermediate level analysis, a narrow level analysis, a specific level analysis, combinations thereof and the like. For example, a broad level analysis may consider all factors in a list of factors, a intermediate level analysis may include most factors, but not all, a narrow level analysis may include some factors but not others, and a specific level analysis may include consideration of only one factor. For example, a specific level analysis may only consider closed caption data, or even a single word of closed caption data. For example, a narrow level analysis may consider closed-caption data and brand data (e.g., identifying a mascot or logo in primary content and/or secondary content), but not audio data. For example, a intermediate level analysis may consider closed-caption data, brand data, and audio data, but not style (e.g., color theme) data. For example, a broad level analysis may consider closed-caption data, brand data, audio data, and style data.

At 703, the one or more items of secondary content and associated one or more text descriptions may be sent to a Brand Alignment Processing (BAP) module.

At 704 one or more relevance scores associated with the one or more topics or keywords may be determined. The one or more relevance scores may be configured to indicate how relevant the one or more topics or keywords are to the (respective) one or more secondary content items. For example, a first item of secondary content of the one or more items of secondary content may be an advertisement for college athletics. For example, the first item of secondary content may be associated with keywords such as “sports,” “college,” “education,” “fitness,” “Georgia,” and “travel.” The relevance scores for “sports,” “college,” “education,” “Georgia,” and “fitness,” may be relatively higher than the relevance score for “travel.” The one or more relevance scores may be associated with one or more granularity levels. For example, at the broad level, an item of secondary content may be associated with one or more first relevance scores. For example, at the narrow level, the item of secondary content may be associated with one or more second relevance scores. The one or more first relevance scores may be the same as, or different from, the one or more second relevance scores. At 705, the one or more items of secondary content and associated relevance scores may be added to a pause ad relevance database. For example, ad category details for a given video or image ad could be provided by the ad provider. For example, ad category relevance for secondary content could be available by content (i.e. ad) provider, alternatively.

At 706, a pause indication may be determined. The pause indication may comprise or otherwise be associated with one or more identifiers and/or timing information. For example, the one or more identifiers may comprise one or more content identifiers, one or more segment identifiers, combinations thereof, and the like. The pause indication may be associated with primary content. The pause indication may be determined based on receiving, by a computing device, the pause indication. The pause indication may be configured to indicate a user has paused primary content being output by, for example, a media device. Based on determining the pause indication, closed caption data and/or other data associated with the primary content being output may be determined. For example, based on receiving the pause indication, a computing device may determine closed caption data associated with some amount of primary content preceding the pause indication. At 707, the text data and/or one or more associated identifiers may be sent to a BAP module. The BAP module may be configured to determine one or more keywords and/or topics or topic distributions associated with the primary content and/or segments thereof. At 708, the BAP module may determine one or more relevance scores associated with the one or more keywords and/or topics associated with the primary content and/or segments thereof. The one or more relevance scores may be configured to indicate how relevant the one or more keywords or topics are to the primary content and/or segments thereof. For example, a first keyword may be “sports,” and an associated relevance score may be 0.507, while a second keyword may be “education” with an associated relevance score of 0.29. This indicates that “sports” is more relevant to the primary content and/or segments thereof than “education.” At 709, an ad selector may determine, based on the one or more relevance scores of the one or more keywords associated with the secondary content and the one or more relevance scores of the one or more keywords associated with the primary content, at least one item of secondary content of the one or more items of secondary content to output. At 710, the at least one item of secondary content may be output. Outputting the at least one item of secondary content of the one or more items of secondary content may comprise sending, to a media device, the at least one item of secondary content.

Figure 8:
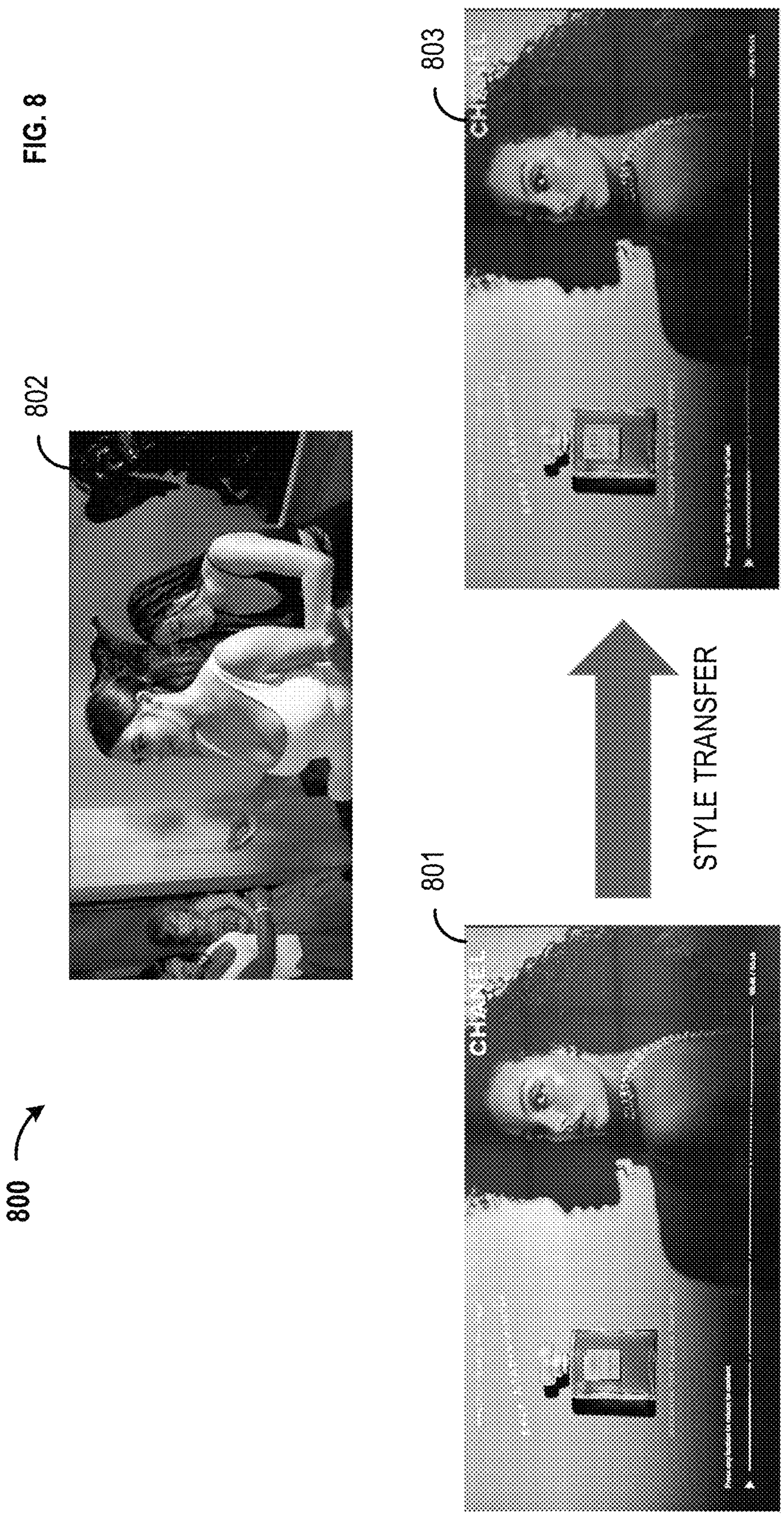
FIG. 8 is a flowchart illustrating an example method.

FIG. 8 shows an example method 800. The method 800 may be configured to achieve a style transfer. A style transfer may comprise alter the content/objects of image data and/or video data. The method 800 may be configured to achieve a palette transfer. A palette transfer may comprising changing colors or other aspects of image data and/or video data. The example method 800 may be carried out via any one or more of the devices described herein. Secondary content 801 may be determined. For example, the secondary content 801 may be an advertisement. The secondary content 801 may be stored in a database such as an advertisement database. The secondary content 801 may be determined based on a similarity between contextual information associated with primary content 802 and contextual information associated with secondary content 801 satisfying a threshold as described herein. For example, the primary content 802 may relate to fashion (e.g., by virtue of featuring Kim Kardashian). Similarly, the secondary content 801 may relate to fashion. At 803, a style transfer may be carried out. The style transfer may comprise determining a style associated with the primary content 802 (e.g., based on one or more of contextual information, palette information, or other information associated with the primary content). The style transfer may comprise manipulating one or more characteristics (e.g., components) of the secondary content 801 to match or otherwise be associated with or based on the style of the primary content 802. In the example 800, the style transfer comprises determining a palette associated with the primary content 802 and adjusting a palette associated with the secondary content 801 to match or otherwise be associated with the palette of the primary content 802, thus generating secondary content 803. The secondary content 803 may be output.

Figure 9:
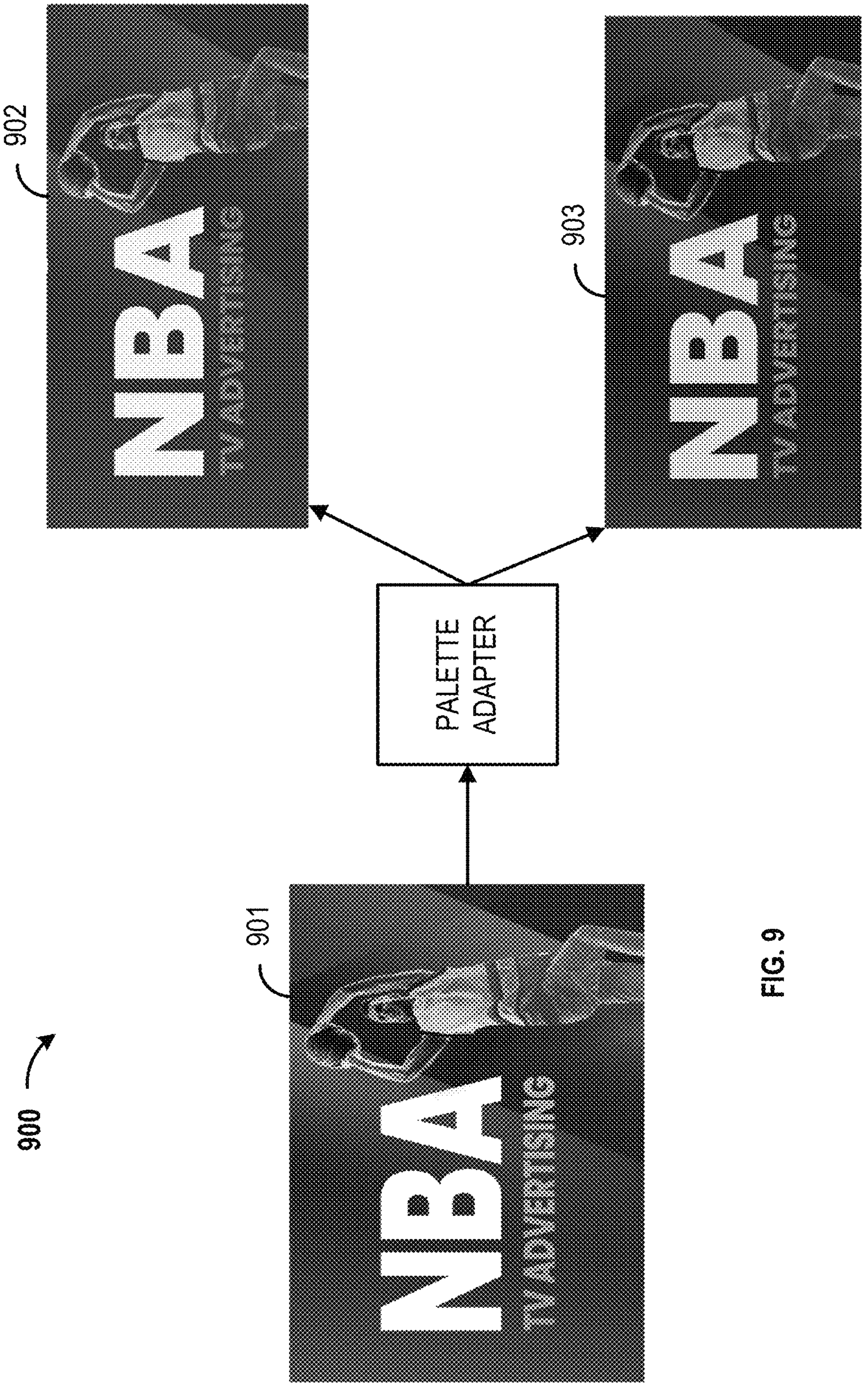
FIG. 9 is a flowchart illustrating an example method.

FIG. 9 shows an example method 900. The method 900 shows a detailed view of a palette transfer. The method 900 may be configured to achieve a palette transfer. The example method 900 may be carried out via any one or more of the devices described herein. Secondary content 901 may be determined. For example, the secondary content 901 may be an advertisement. The secondary content 901 may be stored in a database such as an advertisement database. The palette transfer may comprise determining a palette associated with content viewed immediately prior to the pause moment. The palette transfer may comprise manipulating one or more characteristics (e.g., components) of the secondary content 901 to match or otherwise be associated with or based on the style of the primary content immediately preceding the pause moment. In the example 900, the style transfer comprises determining a palette associated with the primary content and adjusting a palette associated with the secondary content 901 to match or otherwise be associated with the palette of the primary content, thus generating one or more of secondary content 902 or 903. The secondary content may be output.

Figure 10:
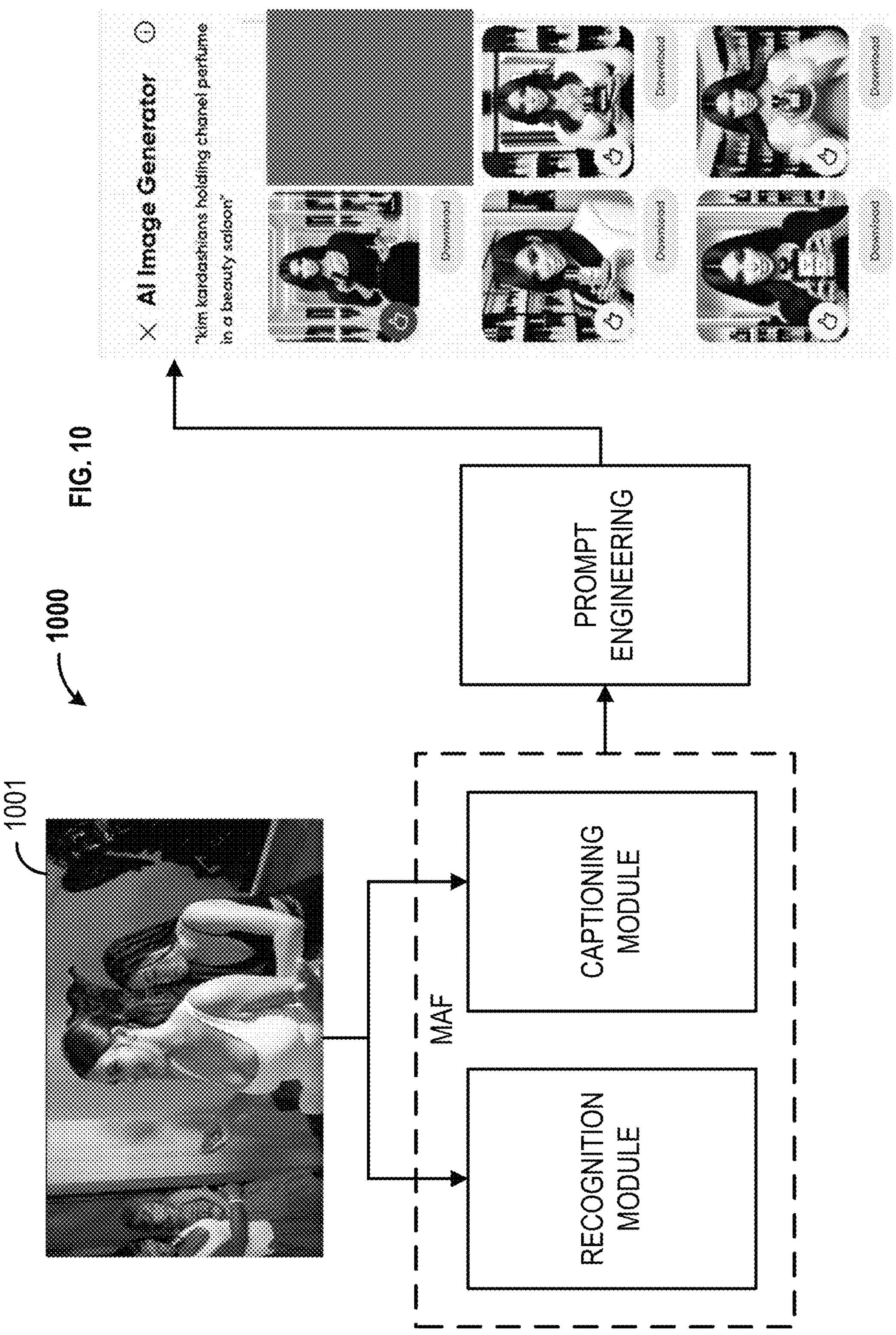
FIG. 10 is a flowchart illustrating an example method.

FIG. 10 shows an example system and method 1000. The example system and method 1000 may be carried out via any one or more of the devices described herein. For example, secondary content 1001 may be determined. The secondary content may comprise, for example, one or more advertisements. The secondary content may comprise image data, text data, and/or metadata. The secondary content may be received at 1001 by a Media Analytics Framework (MAF) system. The MAF system may comprise a recognition module (e.g., a celebrity recognition module) and/or a captioning module. The recognition module may be configured to recognize people, objects, places, sounds, music, and/or other aspects of a scene within secondary content. For example, the recognition module may be configured for facial detection, facial recognition, object detection, object recognition, optical character recognition (OCR), combinations thereof, and the like. The MAF system is a sophisticated and advanced machine learning platform configured to derive real-time insights into any moment of video. The MAF may be configured to analyze one or more (e.g., thousands) of linear video streams in real-time to determine, for example, when a channel has gone to commercial break or which actors are on screen at any moment. The MAF system may be configured to determine specific products such as cars, clothing, furniture, or the like.

The captioning module may be configured to generate and/or analyze one or more captions (as explained herein). A prompt engineering module may receive recognition data from the recognition module and captioning data from the captioning module and generate, based on the recognition data and the captioning data, a prompt. The prompt may be submitted to (e.g., input into) a transformer (e.g., a GPT). The prompt may be configured to cause the transformer to output image data, text data, audio data, metadata, combinations thereof, and the like. The prompt may be configured to cause the transformer to output the image data, text data, audio data, metadata, combinations thereof, and the like, based on the captioning and recognition data determined from the secondary content. The output of the transformer may be contextually related to the secondary content based on the recognition and captioning data.

Figure 11:
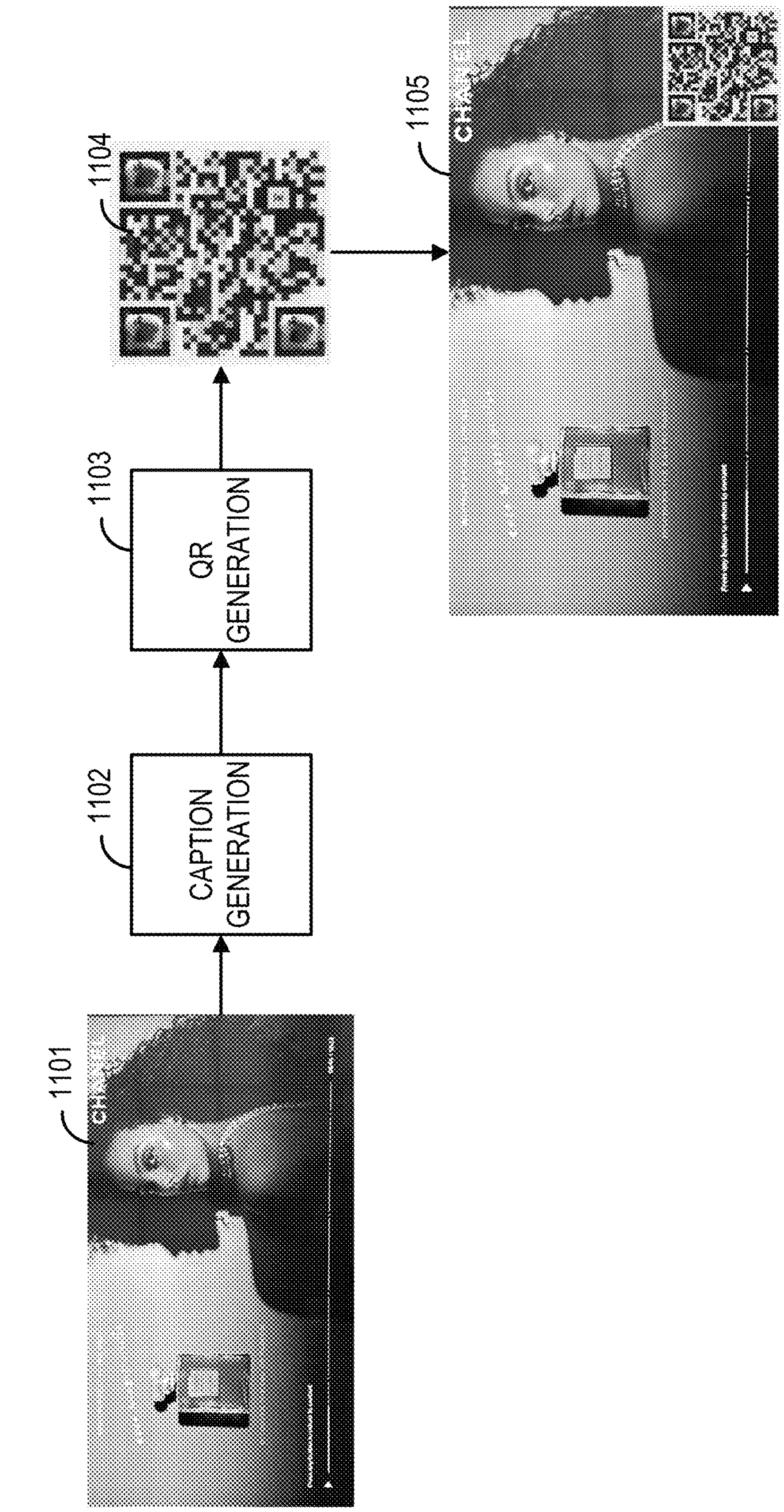
FIG. 11 is a flowchart illustrating an example method.

FIG. 11 shows an example system and method 1100. The example system and method 1100 may be carried out via any one or more of the devices described herein. In the example system and method 1100, secondary content 1101 may be determined. The secondary content may comprise, for example, one or more advertisements. At 1102, image captioning may be performed. The image captioning may be generated based on text data, image data, metadata, combinations thereof, and the like. For example, the image data may comprise video data or still image data. For example, the text data may comprise closed caption data. The text data may comprise data associated with text or symbols in the secondary content (e.g., CHANEL). The caption data may comprise, for example, text, numbers, symbols, etc., Also at 1102, metadata associated with the secondary content may be determined. Generating the caption may comprise inputting one or more images and associated data into a transformer (e.g., a GPT). The transformer may output a caption. For example, for the image shown in FIG. 11, the transformer may output the caption, "the image appears to be a screenshot of a graphical user interface for a website. The content on the interface includes text related to Chanel, specifically the perfume Coco Mademoiselle It also mentions Whitney Peak and the Eau de Parfum. The image may contain a human face, as well as cosmetics and fashion accessories like lipstick." At 1103 a QR code may be generated. The QR code may be generated based on the caption data, the image data, the text data, and/or the metadata. For example, the QR code may comprise a face or some other object included in the secondary content as shown at 1104. Optionally, the method may comprise inserting the QR code into the secondary content as shown at step 1105.

Figure 12:
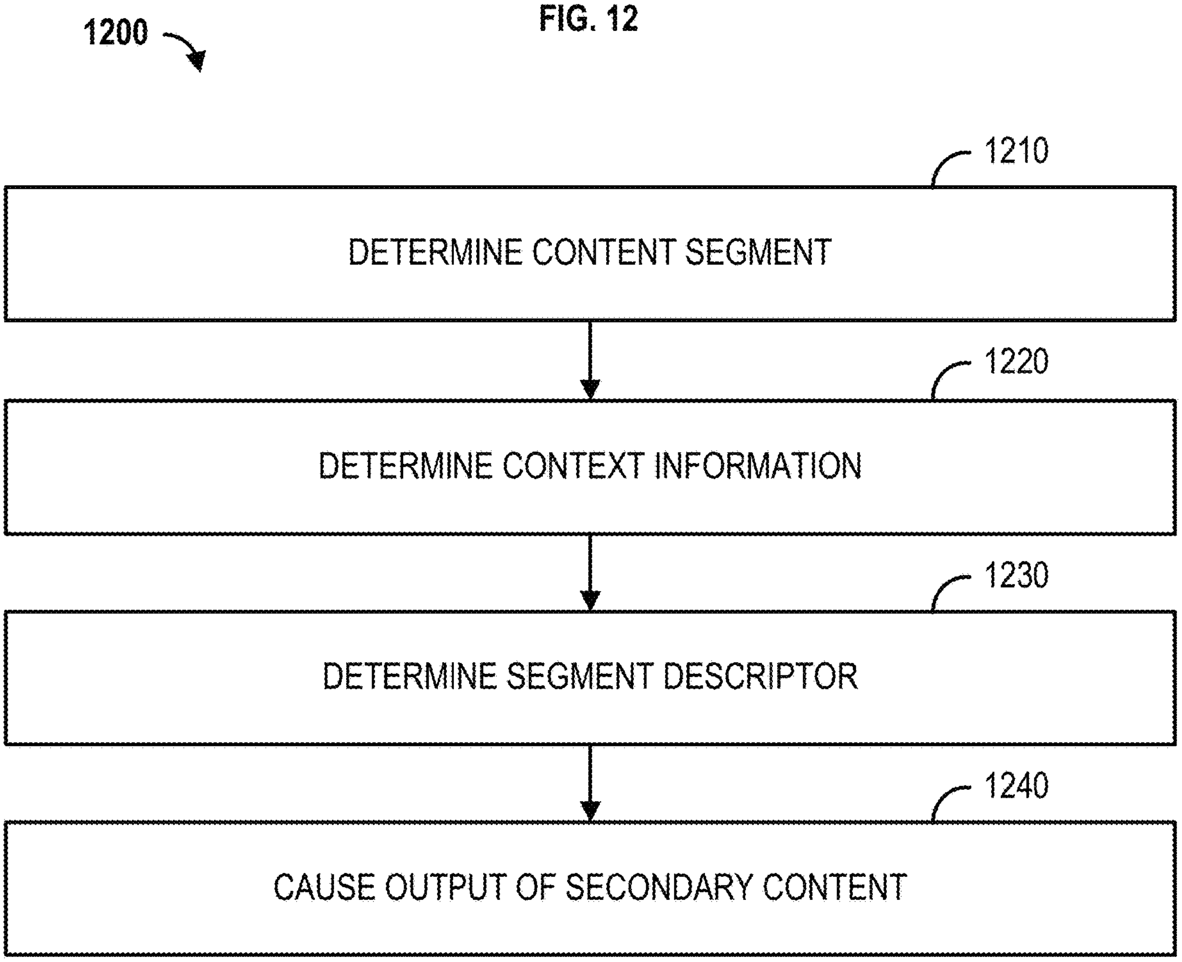
FIG. 12 is a flowchart illustrating an example method.

FIG. 12 shows an example method. The method 1200 may be carried out via one or more of the devices described herein. At 1210 a content segment may be determined. The content segment may be determined based on a pause of primary content output by a user device. For example, the user device may comprise a media device such as a set-top-box, computer, smartphone, or other similar device. For example, a computing device may receive a pause indication from the user device. For example, a user may, while content is being output from the user device, hit "pause" or some other similar command configured to pause the output of a content segment. The content segment may be a content segment (e.g., one or more content segments) that is being output when the user hits pause. The content segment may be a content segment (e.g., one or more content segments) preceding the content segment being output when the user hits pause. The content segment may be a content segment (e.g., one or more content segments) following the content segment being output when the user hits pause. The computing device may determine contextual information associated with any of these content segments. The content segment may be associated with one or more identifiers and/or timing information. Timing data associated with the pause indication. For example, an elapsed time or other timing data associated with the pause indication may be determined. One or more content segment identifiers may be determined based on the pause indication. For example, a content segment identifier associated with the frame during which the pause indication occurred (e.g., when the pause command was received) may be determine. One or more content segment identifiers associated with one or more frames preceding the frame associated with the pause indication may be determined.

At 1220 context information associated with the content segment may be determined. The context information may comprise, for example, text data, closed caption data, metadata, combinations thereof, and the like. Determining, based on the content segment, context information associated with the content segment may comprise determining closed caption information. Determining, based on the content segment, context information associated with the content segment may comprise sending one or more frames of the content segment to an object identifier to identify one or more objects contained within scenes of the content segment. The context information may be determined at one or more levels of granularity. For example, the levels of granularity may be determined based on a broad level analysis, an intermediate level analysis, a narrow level analysis, a specific level analysis, combinations thereof and the like. For example, a broad level analysis may consider all factors in a list of factors, a intermediate level analysis may include most factors, but not all, a narrow level analysis may include some factors but not others, and a specific level analysis may include consideration of only one factor. For example, a specific level analysis may only consider closed caption data, or even a single word of closed caption data. For example, a narrow level analysis may consider closed-caption data and brand data (e.g., identifying a mascot or logo in primary content and/or secondary content), but not audio data. For example, an intermediate level analysis may consider closed-caption data, brand data, and audio data, but not style (e.g., color theme) data. For example, a broad level analysis may consider closed-caption data, brand data, audio data, and style data.

At 1230 a segment descriptor (e.g., one or more segment descriptors) may be determined. The segment descriptor may comprise, for example, one or more keywords, one or more topics, one or more topic distributions, combinations thereof, and the like.

At 1240, the secondary content may be caused to be output. For example, causing the secondary content to be output may be based on a correlation between a plurality of segment descriptors and a plurality of secondary content descriptors satisfying a relevance threshold. The relevance threshold may be indicate the plurality of segment descriptors are, for example, minimally relevant, moderately relevant, highly relevant, etc., The plurality of secondary content descriptors may be associated with a plurality of secondary content relevance scores satisfying the threshold. Causing output of the secondary content may comprise causing the user device to output the secondary content. The secondary content may be contextually relevant to the content segment. For example, the secondary content may be contextually relevant to a preceding segment. The segment descriptor may be associated with one or more relevance scores. The one or more relevance scores may be configured to indicate how relevant the segment descriptor is to the segment. For example, the segment descriptor may be associated with a highest relevance score, indicating that segment descriptor is the most relevant to the content segment.

Determining, based on the context information, the segment descriptor associated with a highest relevance score may comprise sending the context information associated with the content segment to a trained machine learning model, wherein the trained machine learning model is configured to determine one or more segment descriptors and associated relevance scores. For example, the trained machine learning model may be configured to tokenize the context information. For example, the trained machine learning model may be configured to apply a machine learning model to the tokenized context information, wherein the machine learning model is trained according to a plurality of classifications used to categorize content. For example, the trained machine learning model may be configured to output, by the machine learning model, the one or more segment descriptors and the associated relevance scores.

The method may comprise determining the correlation between the segment descriptor and one or more secondary content descriptors does not satisfy a threshold. For example, it may be determined the context information associated with the content segment that was being output when the pause command was received is insufficient to determine the relevance between the content segment that was being output when the pause command was received and the one or more secondary content segment descriptors. In this case, more information may be needed. For example, additional context information associated with one or more content segments preceding the content segment that was being output when the pause command was received (e.g., one or more preceding content segments). For example, additional context information associated with one or more content segments following the content segment that was being output when the pause command was received (e.g., one or more following content segments) may be determined.

The method may comprise storing, in a database, one or more items of secondary content. The method may comprise determining the correlation based on the segment descriptor corresponding to a secondary content descriptor of the one or more secondary content descriptors. The method may comprise discontinuing output of the secondary content based on un-pause of the primary content. The method may comprise discontinuing output of the secondary content based on un-pause of the primary content.

The method may comprise tokenizing a piece of text into smaller units, such as words or subwords. For example, input text may tokenized using a specific tokenizer, which could be based on word-level tokenization, subword tokenization (e.g., Byte Pair Encoding), or character-level tokenization. Each token represents a unit of meaning within the text.

The method may comprise a model inference. For example, the method may comprise using one or more machine learning models to make predictions or perform a task on the tokenized input data. In the context of ensemble methods, multiple models are used in parallel or sequentially to generate predictions. For example, multiple machine learning models may be applied to the tokenized input text to generate predictions. These models may include various architectures such as recurrent neural networks (RNNs), convolutional neural networks (CNNs), transformers, or even traditional machine learning models like support vector machines (SVMs) or random forests.

The method may comprise post-processing. Post-processing may comprise combining the individual predictions from the ensemble of models in various ways (e.g., averaging, voting, stacking) to produce a final prediction. Post-processing may comprise filtering or modifying the predictions based on certain criteria or rules to improve accuracy or address specific requirements of the application.

The method may comprise determining one or more embedding vectors. The one or more embedding vectors may comprise one or more mathematical representations of a piece of data configured to be used in machine learning and natural language processing (NLP). In NLP, the one or more embedding vectors may be associated with words or phrases, and they may be configured to encode semantic information about those words or phrases in a continuous vector space. The one or more embedding vectors may be configured to map words or phrases from a high-dimensional space (like a vocabulary) into a lower-dimensional space where similar words or phrases are closer together. The method may comprise using one or more word embedding techniques such as Word2Vec, GloVe, or FastText.

Figure 13:
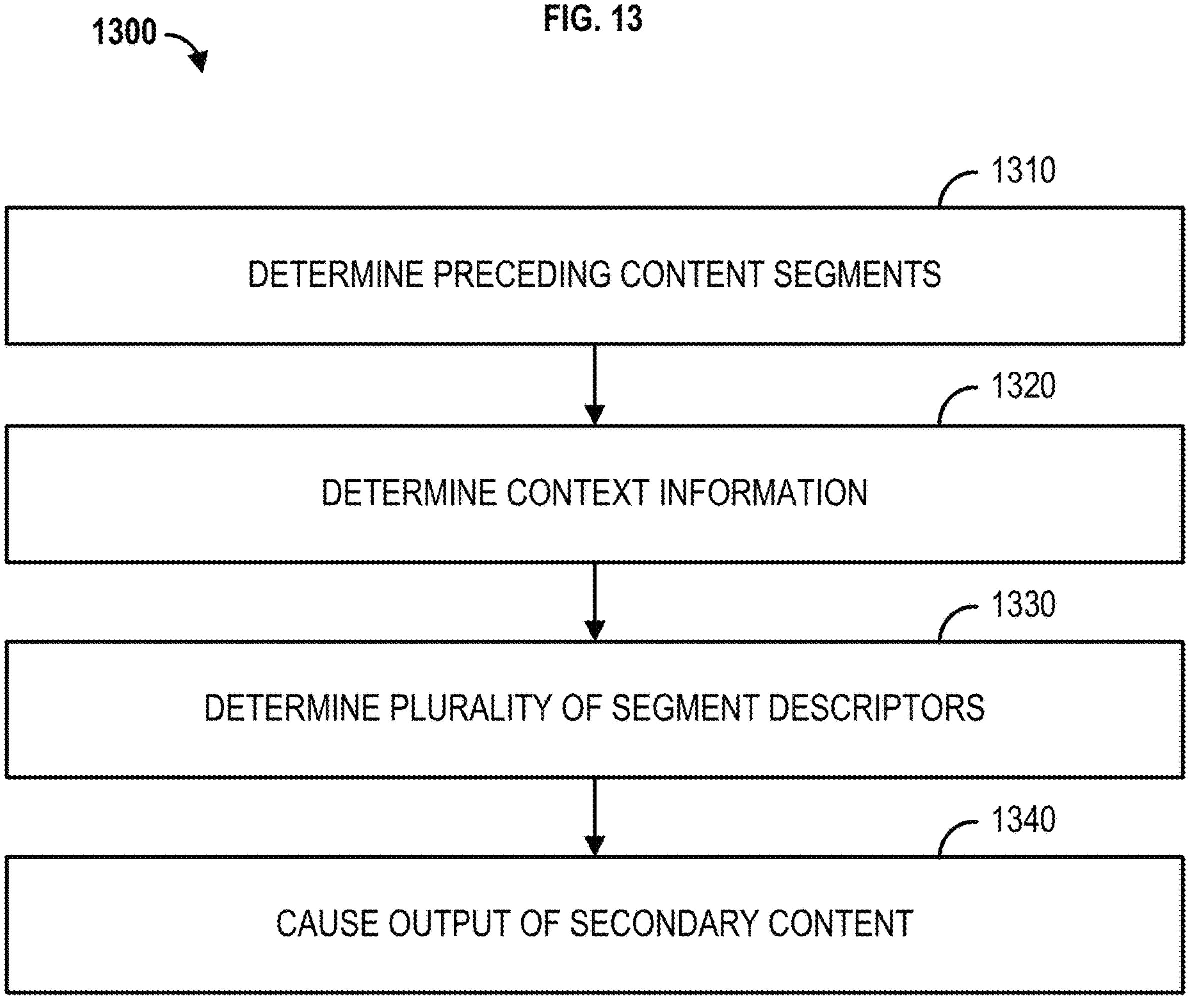
FIG. 13 is a flowchart illustrating an example method.

FIG. 13 shows an example method. The method 1300 may be carried out via one or more of the devices described herein. At 1310, one or more content segments may be determined. The one or more content segments may be one or more content segment preceding a content segment associated with a pause indication (e.g., one or more preceding content segments). The one or more preceding content segments may be determined based on a pause of primary content output by a user device. For example, the user device may comprise a media device such as a set-top-box, computer, smartphone, or other similar device. For example, a computing device may receive a pause indication from the user device. For example, a user may, while content is being output from the user device, hit "pause" or some other similar command configured to pause the output of a content segment. The one or more preceding content segments may be associated with one or more identifiers and/or timing information.

Determining the context information associated with the one or more content segments preceding the content segment may be based on a determination that additional information is needed in order to determine a correlation between the context information and one or more items of secondary content. For example, the method may comprise determining the correlation between the segment descriptor and one or more secondary content descriptors does not satisfy a threshold. For example, it may be determined the context information associated with the content segment that was being output when the pause command was received is insufficient to determine the relevance between the content segment that was being output when the pause command was received and the one or more secondary content segment descriptors. In this case, more information may be needed. For example, additional context information associated with one or more content segments preceding the content segment that was being output when the pause command was received (e.g., one or more preceding content segments). For example, additional context information associated with one or more content segments following the content segment that was being output when the pause command was received (e.g., one or more following content segments) may be determined.

At 1320, context information associated with the one or more preceding content segments may be determined. The context information may comprise, for example, text data, closed caption data, metadata, combinations thereof, and the like. Determining, based on the content segment, context information associated with the one or more preceding content segments may comprise determining closed caption information. Determining context information associated with the one or more preceding content segments may comprise sending one or more frames of the one or more preceding content segments to an object identifier to identify one or more objects contained within scenes of the one or more preceding content segments. The context information may be determined at one or more levels of granularity. For example, the one or more levels of granularity may be determined based on a broad level analysis, an intermediate level analysis, a narrow level analysis, a specific level analysis, combinations thereof and the like. For example, a broad level analysis may consider all factors in a list of factors, a intermediate level analysis may include most factors, but not all, a narrow level analysis may include some factors but not others, and a specific level analysis may include consideration of only one factor. For example, a specific level analysis may only consider closed caption data, or even a single word of closed caption data. For example, a narrow level analysis may consider closed-caption data and brand data (e.g., identifying a mascot or logo in primary content and/or secondary content), but not audio data. For example, an intermediate level analysis may consider closed-caption data, brand data, and audio data, but not style (e.g., color theme) data. For example, a broad level analysis may consider closed-caption data, brand data, audio data, and style data.

At 1330, one or more segment descriptors may be determined. The one or more segments descriptors may be associated with one or more relevance scores. The one or more relevance scores may satisfy a threshold (e.g., a minimum relevance threshold). The one or more segment descriptors may comprise one or more topics, one or more keywords, one or more subjects, combinations thereof, and the like. The one or more segment descriptors may be determined based on context information. Determining the one or more segment descriptors associated with the relevance scores satisfying the threshold may comprise sending the context information associated with the preceding content segments to a trained machine learning model, wherein the trained machine learning model is configured to determine one or more segment descriptors and associated relevance scores. The one or more segment descriptors may be associated with the one or more levels of granularity. For example, one or more first segment descriptors may be associated with (e.g., determined based on) the broad analysis, one or more second segment descriptors may be associated with an intermediate level analysis, one or more third segment descriptors may be associated with a narrow level analysis, and one or more fourth segment descriptors may be associated with a specific level analysis.

At 1340, secondary content may be output. Causing the secondary content to be output may be based on a correlation between the plurality of segment descriptors and a plurality of secondary content descriptors. The plurality of secondary content descriptors may be associated with a plurality of secondary content relevance scores satisfying the threshold. Causing output of the secondary content may comprise causing the user device to output the secondary content.

The method may comprise sending the context information associated with the one or more preceding content segments to a trained machine learning model, wherein the trained machine learning model is configured to determine one or more segment descriptors and one or more relevance scores. The method may comprise determining, based on the one or more segment descriptors and the one or more relevance scores, a segment descriptor associated with a highest relevance score. The method may further comprise determining, based on the one or more secondary content descriptors and the one or more secondary content relevance scores, one or more secondary content descriptors satisfying the highest relevance score. The method may comprise determining the correlation based on a secondary content descriptor of the one or more secondary content descriptors, wherein the secondary content descriptor is associated with a highest secondary content relevance score. The method may comprise determining, based on the one or more segment descriptors and the one or more relevance scores, a segment descriptor associated with a highest relevance score. The method may comprise determining the correlation based on a difference between the highest relevance score and each of the one or more secondary content relevance scores. The difference may be indicative of a minimum value.

Figure 14:
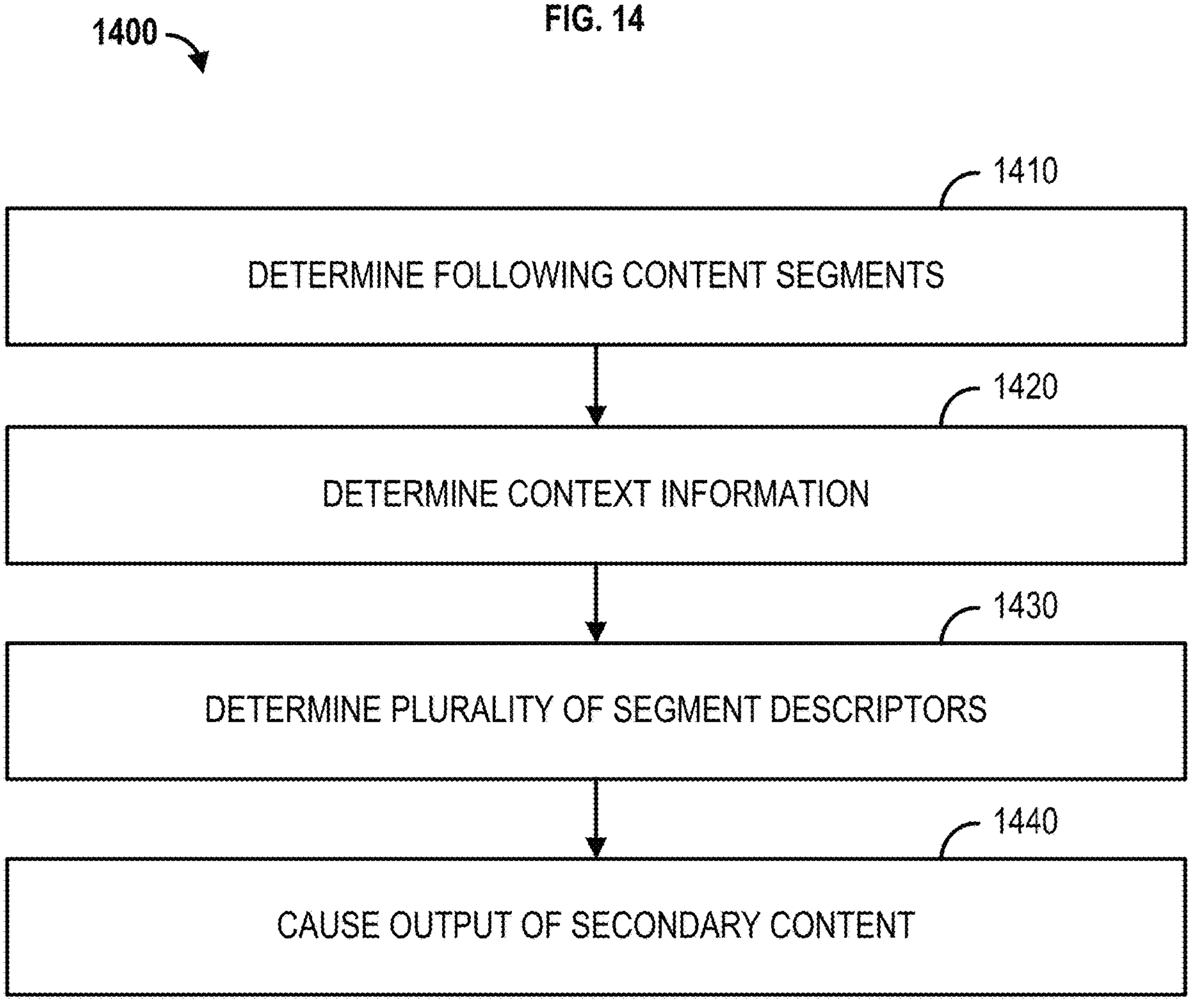
FIG. 14 is a flowchart illustrating an example method.

FIG. 14 shows an example method. The method 1400 may be carried out via one or more of the devices described herein. At 1410, one or more content segments subsequent a content segment (e.g., one or more subsequent content segments) associated with a pause of primary content output by a user device may be determined. For example, a user may cause a pause command to be sent. The pause command may be configured to pause output of primary content. For example, the user device may comprise a media device such as a set-top-box, computer, smartphone, or other similar device. For example, a computing device may receive a pause indication from the user device. For example, a user may, while content is being output from the user device, hit "pause" or some other similar command configured to pause the output of a content segment. The content segment may be associated with one or more identifiers and/or timing information.

At 1420, context information associated with the one or more subsequent content segments may be determined. The context information may comprise, for example, text data, closed caption data, metadata, combinations thereof, and the like. Determining context information associated with the one or more subsequent content segments may comprise determining closed caption information. Determining context information associated with the one or more subsequent content segments may comprise sending one or more frames of the one or more subsequent content segments to an object identifier to identify one or more objects contained within scenes of the one or more subsequent content segments. The context information may be determined at one or more levels of granularity. For example, the one or more levels of granularity may be determined based on a broad level analysis, a intermediate level analysis, a narrow level analysis, a specific level analysis, combinations thereof and the like. For example, a broad level analysis may consider all factors in a list of factors, an intermediate level analysis may include most factors, but not all, a narrow level analysis may include some factors but not others, and a specific level analysis may include consideration of only one factor. For example, a specific level analysis may only consider closed caption data, or even a single word of closed caption data. For example, a narrow level analysis may consider closed-caption data and brand data (e.g., identifying a mascot or logo in primary content and/or secondary content), but not audio data. For example, an intermediate level analysis may consider closed-caption data, brand data, and audio data, but not style (e.g., color theme) data. For example, a broad level analysis may consider closed-caption data, brand data, audio data, and style data.

Determining the context information associated with the one or more content segments preceding the content segment may be based on a determination that additional information is needed in order to determine a correlation between the context information and one or more items of secondary content. For example, the method may comprise determining the correlation between the segment descriptor and one or more secondary content descriptors does not satisfy a threshold. For example, it may be determined the context information associated with the content segment that was being output when the pause command was received is insufficient to determine the relevance between the content segment that was being output when the pause command was received and the one or more secondary content segment descriptors. In this case, more information may be needed. For example, additional context information associated with one or more content segments preceding the content segment that was being output when the pause command was received (e.g., one or more preceding content segments). For example, additional context information associated with one or more content segments following the content segment that was being output when the pause command was received (e.g., one or more following content segments) may be determined.

At 1430, one or more segment descriptors may be determined. The one or more segments descriptors may be associated with one or more relevance scores. The one or more relevance scores may satisfy a threshold (e.g., a minimum relevance threshold). The one or more segment descriptors may comprise one or more topics, one or more keywords, one or more subjects, combinations thereof, and the like. The one or more segment descriptors may be determined based on context information. Determining the one or more segment descriptors associated with the relevance scores satisfying the threshold may comprise sending the context information associated with the one or more subsequent content segments to a trained machine learning model, wherein the trained machine learning model is configured to determine one or more segment descriptors and associated relevance scores. The one or more segment descriptors may be associated with the one or more levels of granularity. For example, one or more first segment descriptors may be associated with (e.g., determined based on) the broad analysis, one or more second segment descriptors may be associated with an intermediate level analysis, one or more third segment descriptors may be associated with a narrow level analysis, and one or more fourth segment descriptors may be associated with a specific level analysis.

At 1440, the secondary content may be output. Causing the secondary content to be output may be based on a correlation between the one or more segment descriptors and a one or more secondary content descriptors. The one or more secondary content descriptors may be associated with one or more secondary content relevance scores satisfying the threshold. Causing output of the secondary content may comprise causing the user device to output the secondary content.

The method may comprise sending the context information associated with the one or more preceding content segments to a trained machine learning model, wherein the trained machine learning model is configured to determine one or more segment descriptors and one or more relevance scores. The method may comprise determining, based on the one or more segment descriptors and the one or more relevance scores, a segment descriptor associated with a highest relevance score. The method may further comprise determining, based on the one or more secondary content descriptors and the one or more secondary content relevance scores, one or more secondary content descriptors satisfying the highest relevance score. The method may comprise determining the correlation based on a secondary content descriptor of the one or more secondary content descriptors, wherein the secondary content descriptor is associated with a highest secondary content relevance score. The method may comprise determining, based on the one or more segment descriptors and the one or more relevance scores, a segment descriptor associated with a highest relevance score. The method may comprise determining the correlation based on a difference between the highest relevance score and each of the one or more secondary content relevance scores. The difference may be indicative of a minimum value.

Figure 15:
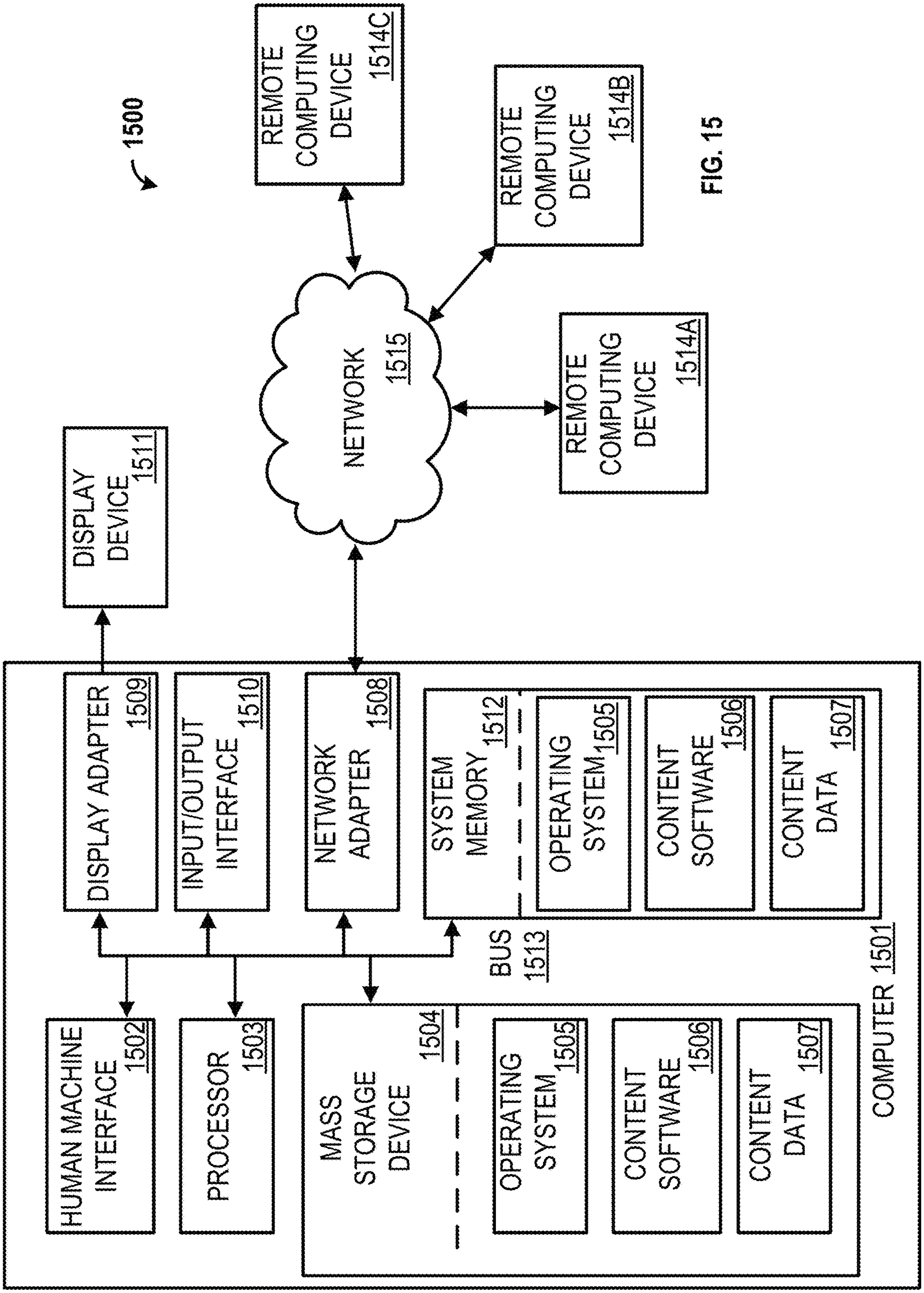
FIG. 15 is a block diagram illustrating an example computing device.

The methods and systems can be implemented on a computer 1501 as illustrated in FIG. 15 and described below. Similarly, the methods and systems disclosed can utilize one or more computers to perform one or more functions in one or more locations. FIG. 15 is a block diagram illustrating an example operating environment 1500 for performing the disclosed methods. This example operating environment 1500 is only an example of an operating environment and is not intended to suggest any limitation as to the scope of use or functionality of operating environment architecture. Neither should the operating environment 1500 be interpreted as having any dependency or requirement relating to any one or combination of components illustrated in the example operating environment 1500.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage content including memory storage devices.

Further, one skilled in the art will appreciate that the systems and methods disclosed herein can be implemented via a general-purpose computing device in the form of a computer 1501. In an aspect, the computer 1501 can serve as the content provider. The computer 1501 can comprise one or more components, such as one or more processors 1503, a system memory 1512, and a bus 1513 that couples various components of the computer 1501 including the one or more processors 1503 to the system memory 1512. In the case of multiple processors 1503, the operating environment 1500 can utilize parallel computing.

The bus 1513 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1513, and all buses specified in this description can also be implemented over a wired or wireless network connection and one or more of the components of the computer 1501, such as the one or more processors 1503, a mass storage device 1504, an operating system 1505, content software 1506, content data 1507, a network adapter 1508, system memory 1512, an Input/Output Interface 1510, a display adapter 1509, a display device 1511, and a human machine interface 1502, can be contained within one or more remote computing devices 1514A,B,C at physically separate locations, connected through buses of this form, in effect implementing a fully distributed system.

The computer 1501 typically comprises a variety of computer readable content. Example readable content can be any available content that is accessible by the computer 1501 and comprises, for example and not meant to be limiting, both volatile and non-volatile content, removable and non-removable content. The system memory 1512 can comprise computer readable content in the form of volatile memory, such as random access memory (RAM), and/or non-volatile memory, such as read only memory (ROM). The system memory 1512 typically can comprise data such as content data 1507 and/or program modules such as operating system 1505 and content software 1506 that are content accessible to and/or are operated on by the one or more processors 1503.

In another aspect, the computer 1501 can also comprise other removable/non-removable, volatile/non-volatile computer storage content. The mass storage device 1504 can provide non-volatile storage of computer code, computer readable instructions, data structures, program modules, and other data for the computer 1501. For example, a mass storage device 1504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1504, including by way of example, an operating system 1505 and content software 1506. The content data 1507 can also be stored on the mass storage device 1504. Content data 1507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1515.

In an aspect, the user can enter commands and information into the computer 1501 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 1503 via a human machine interface 1502 that is coupled to the bus 1513, but can be connected by other interface and bus structures, such as a parallel port, game port, an IEEE 1394 Port (also known as a Firewire port), a serial port, network adapter 1508, and/or a universal serial bus (USB).

In yet another aspect, a display device 1511 can also be connected to the bus 1513 via an interface, such as a display adapter 1509. It is contemplated that the computer 1501 can have more than one display adapter 1509 and the computer 1501 can have more than one display device 1511. For example, a display device 1511 can be a monitor, an LCD (Liquid Crystal Display), light emitting diode (LED) display, television, smart lens, smart glass, and/or a projector. In addition to the display device 1511, other output peripheral devices can comprise components such as speakers (not shown) and a printer (not shown) which can be connected to the computer 1501 via Input/Output Interface 1510. Any step and/or result of the methods can be output in any form to an output device. Such output can be any form of visual representation, including, but not limited to, textual, graphical, animation, audio, tactile, and the like. The display 1511 and computer 1501 can be part of one device, or separate devices.

The computer 1501 can operate in a networked environment using logical connections to one or more remote computing devices 1514A,B,C. By way of example, a remote computing device 1514A,B,C can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1501 and a remote computing device 1514A,B,C can be made via a network 1515, such as a local area network (LAN) and/or a general wide area network (WAN). Such network connections can be through a network adapter 1508. The network adapter 1508 can be implemented in both wired and wireless environments. Such networking environments are conventional and commonplace in dwellings, offices, enterprise-wide computer networks, intranets, and the Internet. In an aspect, the remote computing devices 1514A,B,C can serve as first and second devices for displaying content. For example, the remote computing device 1514A can be a first device for displaying portions of primary content, and one or more of the remote computing devices 1514B,C can be a second device for displaying secondary content. As described above, the secondary content is provided to the second device (e.g., one or more of the remote computing devices 1514B,C) in lieu of providing the secondary content to the first device (i.e., the remote computing device 1514A). This allows the first device to display multiple portions of primary content contiguously, without in-line breaks for secondary content.

For purposes of illustration, application programs and other executable program components such as the operating system 1505 are illustrated herein as discrete blocks, although it is recognized that such programs and components can reside at various times in different storage components of the computing device 1501, and are executed by the one or more processors 1503 of the computer 1501. An implementation of content software 1506 can be stored on or transmitted across some form of computer readable content. Any of the disclosed methods can be performed by computer readable instructions embodied on computer readable content. The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

based on a pause of primary content output by a user device, determining a content segment preceding the pause of the primary content;

determining, based on the content segment, context information associated with the content segment;

determining, based on the context information, a segment descriptor associated with a highest relevance score; and based on a correlation between the segment descriptor and one or more secondary content descriptors, causing output of secondary content by the user device during the pause of the primary content.

2. The method of claim 1, wherein determining, based on the content segment, context information associated with the content segment comprises determining closed caption information.

3. The method of claim 1, wherein determining, based on the content segment, context information associated with the content segment comprises sending one or more frames of the content segment to an object identifier to identify one or more objects contained within scenes of the content segment.

4. The method of claim 1, wherein determining, based on the context information, the segment descriptor associated with the highest relevance score comprises sending the context information associated with the content segment to a trained machine learning model, wherein the trained machine learning model is configured to determine one or more segment descriptors and associated relevance scores.

5. The method of claim 4, wherein the trained machine learning model is further configured to:
tokenize the context information;
apply a machine learning model to the tokenized context information, wherein the machine learning model is trained according to a plurality of classifications used to categorize content; and
output, by the machine learning model, the one or more segment descriptors and the associated relevance scores.

6. The method of claim 1, further comprising making a database of one or more secondary content segments using machine learning.

7. The method of claim 1, further comprising: determining the correlation based on the segment descriptor corresponding to a secondary content descriptor of the one or more secondary content descriptors.

8. A method comprising:
based on a pause of primary content output by a user device, determining one or more content segments preceding a content segment associated with the pause of the primary content;
determining context information associated with the one or more content segments preceding the content segment;
determining, based on the context information, one or more segment descriptors associated with the one or more content segments; and
based on a correlation between the one or more segment descriptors and one or more secondary content descriptors satisfying a relevance threshold, causing output of secondary content by the user device during the pause of the primary content.

9. The method of claim 8, wherein determining the context information associated with the one or more content segments comprises determining one or more of: closed caption information, object recognition data, or audio data.

10. The method of claim 8, wherein determining the context information associated with the one or more content segments comprises sending one or more frames of the one or more content segments to an object identifier to identify one or more objects contained within scenes of the one or more content segments.

11. The method of claim 8, wherein determining, based on the context information, the one or more segment descriptors comprises sending the context information associated with the one or more content segments to a trained machine learning model, wherein the trained machine learning model is configured to determine one or more segment descriptors and associated relevance scores.

12. The method of claim 11, wherein the trained machine learning model is further configured to:
tokenize the context information;
apply a machine learning model to the tokenized context information, wherein the machine learning model is trained according to a plurality of classifications used to categorize content; and
output, by the machine learning model, the one or more segment descriptors and the associated relevance scores.

13. The method of claim 8, further comprising making a database of one or more secondary content segments using machine learning.

14. The method of claim 8, further comprising:
determining the correlation based on the one or more segment descriptors corresponding to a secondary content descriptor of the one or more secondary content descriptors.

15. A method comprising:
based on a pause of primary content output by a user device, determining one or more content segments subsequent to content segment associated with the pause of the primary content;
determining context information associated with the one or more content segments subsequent to the content segment;
determining, based on the context information, one or more segment descriptors associated with the one or more content segments subsequent to the content segment; and
based on a correlation between the one or more segment descriptors and one or more secondary content descriptors satisfying a relevance threshold, causing output of secondary content by the user device during the pause of the primary content.

16. The method of claim 15, wherein determining context information associated with the one or more content segments comprises determining closed caption information, object recognition data, or audio data.

17. The method of claim 15, wherein determining the context information associated with the one or more content segments comprises sending one or more frames of the one or more content segments to an object identifier to identify one or more objects contained within scenes of the one or more content segments.

18. The method of claim 15, wherein determining, based on the context information, the one or more segment descriptors comprises sending the context information associated with the one or more content segments to a trained machine learning model, wherein the trained machine learning model is configured to determine one or more segment descriptors and associated relevance scores.

19. The method of claim 18, wherein the trained machine learning model is further configured to:
tokenize the context information;
apply a machine learning model to the tokenized context information, wherein the machine learning model is trained according to a plurality of classifications used to categorize content; and
output, by the machine learning model, the one or more segment descriptors and the associated relevance scores.

20. The method of claim 15, further comprising making a database of one or more secondary content segments using machine learning.

* * * * *